US006980899B2

(12) United States Patent
Minowa et al.

(10) Patent No.: US 6,980,899 B2
(45) Date of Patent: Dec. 27, 2005

(54) APPARATUS FOR CONTROLLING RUN OF A CAR, AND CAR USING THE APPARATUS

(76) Inventors: Toshimichi Minowa, c/o Hitachi, Ltd., Intellectual Property Group, New Marunouchi Bldg. 5-1, Marunouchi 1-chome, Chiyoda-ku, Tokyo 100-8220 (JP); Satoru Kuragaki, c/o Hitachi, Ltd., Intellectual Property Group, New Marunouchi Bldg. 5-1, Marunouchi 1-chome, Chiyoda-ku, Tokyo 100-8220 (JP); Kazuhiko Satou, c/o Hitachi, Ltd., Intellectual Property Group, New Marunouchi Bldg. 5-1, Marunouchi 1-chome, Chiyoda-ku, Tokyo 100-8220 (JP); Tokuji Yoshikawa, c/o Hitachi, Ltd., Intellectual Property Group, New Marunouchi Bldg. 5-1, Marunouchi 1-chome, Chiyoda-ku, Tokyo 100-8220 (JP)

( * ) Notice: Subject to any disclaimer, the term of this patent is extended or adjusted under 35 U.S.C. 154(b) by 0 days.

(21) Appl. No.: 10/379,580

(22) Filed: Mar. 6, 2003

(65) Prior Publication Data

US 2003/0149521 A1 Aug. 7, 2003

Related U.S. Application Data

(60) Continuation of application No. 10/161,610, filed on Jun. 5, 2002, now Pat. No. 6,564,137, which is a division of application No. 09/860,576, filed on May 21, 2001, now Pat. No. 6,351,701.

(30) Foreign Application Priority Data

Jul. 1, 1999 (JP) .......................................... 11-187247

(51) Int. Cl.$^{7}$ ............................ G06F 7/00; G06F 17/00

(52) U.S. Cl. ............................ 701/70; 701/93; 701/96; 180/170; 180/167; 180/168; 180/169

(58) Field of Search ................................ 180/167, 168, 180/169, 170; 701/96, 70, 93

(56) References Cited

U.S. PATENT DOCUMENTS

| | | | | | |
|---|---|---|---|---|---|
| 5,215,159 | A | * | 6/1993 | Nishida | 180/179 |
| 5,670,953 | A | * | 9/1997 | Satoh et al. | 340/903 |
| 5,927,419 | A | * | 7/1999 | Tokimoto | 180/170 |
| 6,044,321 | A | * | 3/2000 | Nakamura et al. | 701/96 |
| 6,056,374 | A | * | 5/2000 | Hiwatashi | 303/193 |
| 6,134,497 | A | * | 10/2000 | Hayashi et al. | 701/70 |
| 2001/0027367 | A1 | * | 10/2001 | Maruko et al. | 701/70 |
| 2002/0044047 | A1 | * | 4/2002 | Miyakoshi et al. | 340/435 |
| 2002/0091478 | A1 | * | 7/2002 | Tamura et al. | 701/70 |
| 2003/0236605 | A1 | * | 12/2003 | Takahashi | 701/45 |
| 2004/0085197 | A1 | * | 5/2004 | Watanabe et al. | 340/435 |
| 2004/0140143 | A1 | * | 7/2004 | Saeki et al. | 180/271 |

FOREIGN PATENT DOCUMENTS

| | | | |
|---|---|---|---|
| EP | 0383634 | A | 4/1990 |
| FR | 1201623 | A | 1/1960 |
| FR | 2748831 | A | 11/1997 |
| JP | 4-38600 | | 2/1992 |
| JP | 8-142817 | | 6/1996 |
| JP | 9-123883 | | 5/1997 |

OTHER PUBLICATIONS

European Search Report Mailed Oct. 4, 2004.

* cited by examiner

*Primary Examiner*—William A. Cuchlinski, Jr.
*Assistant Examiner*—Olga Hernandez

(57) ABSTRACT

In a system of accelerating a car using a brake operating mechanism, the driver is required to be ready to step on the brake operating mechanism so as to rapidly decelerate the car in order to avoid danger, if necessary, while he is releasing his foot from the brake operating mechanism, which is a burden for the driver. Therefore, a footrest function range and a braking force increasing function range are provided to an operating amount or an operating force of a pedal 13.

2 Claims, 25 Drawing Sheets

(a)

(b)

APPARATUS FOR CONTROLLING RUN OF A CAR, AND CAR USING THE APPARATUS

This application is a continuation of application Ser. No. 10/161,610, filed Jun. 5, 2002 now U.S. Pat. No. 6,564,137, which is a divisional of Ser. No. 09/860,576 filed May 21, 2001 now U.S. Pat. No. 6,351,701.

BACKGROUND OF THE INVENTION

The present invention relates to an apparatus for controlling run of a car, a method of controlling run of a car and a car using the apparatus and, more particularly to following distance controlling auto-cruise including slow acceleration and deceleration running in a congested area. Automatic control technologies are being developed. The automatic control technologies are that a distance between a self-car and a preceding car (including an obstacle) is detected using a radar, and an engine, a motor, a transmission and a brake are automatically controlled so that the distance becomes a safe following distance. An example of the automatic control technologies is following distance controlling auto-cruise including slow acceleration and deceleration running in a congested area (hereinafter, referred to as "ACC": Adaptive Cruise Control).

Among the ACC, there are known systems that automatic control is performed only for starting and acceleration operations and a driver operates deceleration and stopping according to his own decision in order to secure higher safety.

One example of the systems is that deceleration and stopping operations and starting and acceleration operations are performed by operating only a brake pedal using a conventional oil brake system.

For example, Japanese Patent Application Laid-Open No.4-38600 discloses a system that when the running mode is set to a slow deceleration running mode due to traffic congestion, the car can be stopped and started by one-pedal running of braking operation. That is, the driving force is controlled so that the running speed of the car becomes a target running speed when there is no brake operation, and the diving force is controlled not to act toward a running direction when there is brake operation.

According to the conventional technologies described above, in order to perform stopping and starting operations by one pedal of braking operation using a conventional brake operating mechanism, the pedal can be used only as if it is an ON-OFF switch, that is, the car is decelerated and stopped when the brake pedal is stepped on, and started and accelerated when the brake pedal is released.

Therefore, in a case of, for example, acceleration a car, the driver is required to be ready to step on the brake operating mechanism so as to rapidly decelerate the car in order to avoid danger, if necessary, while he is releasing his foot from the brake operating mechanism, which is a burden for the driver.

SUMMARY OF THE INVENTION

The present invention is characterized by an apparatus for controlling run of a car, the apparatus comprising a pedal for controlling both of a braking force and a driving force of the car depending on an operating amount or an operating force, a footrest function range and a braking force increasing function range being provided in the operating amount or the operating force of the pedal, wherein a footrest function is realized when the operating amount or the operating force of the pedal is within the footrest function range, and run of the car is controlled by a braking force, the braking force being increased corresponding to the operating amount or the operating force of the pedal when the operating amount or the operating force of the pedal is within the braking force increasing function range.

Further, the present invention is characterized by an apparatus for controlling run of a car, the apparatus comprising a pedal for controlling both of a braking force and a driving force of the car depending on an operating amount or an operating force, a footrest function range, a driving force decreasing function range and a braking force increasing function range being provided in the operating amount or the operating force of the pedal, wherein a footrest function is realized when the operating amount or the operating force of the pedal is within the footrest function range, and run of the car is controlled by a driving force, the driving force being decreased corresponding to the operating amount or the operating force of the pedal when the operating amount or the operating force of the pedal is within the driving force decreasing function range; and a braking force, the braking force being increased corresponding to the operating amount or the operating force of the pedal when the operating amount or the operating force of the pedal is within the braking force increasing function range.

Further, the present invention is characterized by that a driving force is generated when the operating amount or the operating force of the pedal is within the footrest function range.

Further, the present invention is characterized by an apparatus for controlling run of a car, the apparatus comprising a pedal for controlling both of a braking force and a driving force of the car depending on an operating amount or an operating force; and a braking mechanism for braking wheels corresponding to the operating amount and the operating force of the pedal, a footrest function range and a braking force increasing function range being provided in the operating amount or the operating force of the pedal, wherein a footrest function is realized when the operating amount or the operating force of the pedal is within the footrest function range, and the braking mechanism is controlled by a braking force, the braking force being increased corresponding to the operating amount or the operating force of the pedal when the operating amount or the operating force of the pedal is within the braking force increasing function range.

Further, the present invention is characterized by an apparatus for controlling run of a car, the apparatus comprising a pedal for controlling both of a braking force and a driving force of the car depending on an operating amount or an operating force; a braking mechanism for braking wheels corresponding to the operating amount and the operating force of the pedal; a following distance detector for detecting a following distance; and a driving force control unit for controlling a driving force corresponding to a signal of the following distance detector, a footrest function range and a driving force decreasing function range being provided in the operating amount or the operating force of the pedal, wherein a footrest function is realized when the operating amount or the operating force of the pedal is within the footrest function range, and the braking mechanism is controlled by a braking force, the braking force being increased corresponding to the operating amount or the operating force of the pedal when the operating amount or the operating force of the pedal is within the braking force increasing function range.

Further, the present invention is characterized by an apparatus for controlling run of a car comprising a first pedal; a second pedal; a footrest apparatus for realizing a footrest function in the first pedal; and a control unit for executing control of a one-pedal mode which controls both of a braking force and a driving force of the car corresponding to an operating amount or an operating force of the first pedal, wherein a means for realizing the footrest function in the footrest apparatus comprises a mechanical stopper mechanism. The mechanical stopper mechanism has an advantage that the footrest apparatus can be constructed with a simple structure even if the other kind of energy such as electric power is difficult to be obtained.

Similarly, a means for realizing the footrest function in the footrest apparatus can be constructed using a solenoid mechanism. By doing so, the holding force can be optimally adjusted by adjusting the electric energy to the load added by a driver's foot.

Further, a means for realizing the footrest function in the footrest apparatus similarly can be constructed using a combination of springs and cranks. By the means of such a kind, the footrest apparatus can be also constructed without using electric power.

Further, the present invention is characterized by an apparatus for controlling run of a car comprising a first pedal; a second pedal; means for starting and stopping operation of a car power source; and a control unit for selectively executing at least two modes of control of a one-pedal mode and a normal mode, the one-pedal mode control controlling both of a braking force and a driving force of the car corresponding to an operating amount or an operating force of the first pedal, the normal mode control controlling the braking force of the car based on the first pedal and the driving force of the car based on the second pedal, wherein the means for executing starting and stopping of operation of the car power source executes starting of operation of the car power source at the normal mode control. By the apparatus, it is possible to prevent the power source from being operated to start the car when the first pedal is not operated.

Further, the present invention is constructed so that the control unit automatically switches the control from the one-pedal mode control to the normal mode control when operation of the car power source is stopped. By doing so, there is an effect in that since the control unit is in the normal mode operation after stopping operation of the power source, the power source can be started without delay when the power source is restarted.

Further, the present invention is constructed so that the control unit operates the first pedal and executes starting of operation of the car power source at the one-pedal mode control. By doing so, since the power source can be started to be operated while the braking force is added by operating the first pedal even in the one-pedal mode control, the power source can be started to be operated while the car is safely stopped. This method can be applied to idle stop of the power source on an occasion of waiting for traffic signal change, traffic congestion or the like.

Further, the present invention is constructed so that the control unit changes a set acceleration from an acceleration for straight running to another preset acceleration when the car running under the one-pedal mode control on a road in a country or an area where a navigable lane for cars on the road is regulated on the left with respect to traffic flow is turned to the right or turned around the right, or when the car running under the one-pedal mode control on a road in a country or an area where a navigable lane for cars on the road is regulated on the right with respect to traffic flow is turned to the left or turned around the left.

Since the car mounting the apparatus for controlling running in accordance with the present invention is used on an ordinary road, it happens that the car is turned to the right or the left at an intersection or the like. In such a case, when the car is turned to the right in a country such as Japan where the navigable lane is regulated on the left, the car often needs to be speedy turned to the right by passing between cars running on the opposite lane while securing safety. In that case, it is safer to turn to the right if the control unit changes the mode to the preset acceleration for right turning when the car is turned to the right, as in the present invention. On the other hand, when the car is turned to the right in a country or an area where the navigable lane is regulated on the right, it is safer to turn to the left if the control unit changes the mode to the preset acceleration for left turning.

Further, the present invention is constructed so that the control unit changes a set acceleration from an acceleration for straight running to another preset acceleration when the car running under the one-pedal mode control on an ordinary road is turned to the right or turned around the right or when turned to the left or turned around the left. By setting as described above, when the car is turned to the left at an intersection without traffic signals, for example, at an intersection with a stop sign in a country or an area where the navigable lane is regulated on the left, the car often needs to be speedy turned to the right by passing between cars running on the opposite lane while securing safety. In that case, it is safer to turn to the left if the control unit changes the mode to the preset acceleration for left turning when the car is turned to the left, as in the present invention. On the other hand, when the car is turned to the right in a country or an area where the navigable lane is regulated on the right, it is safer to turn to the left if the control unit changes the mode to the preset acceleration for right or left turning.

It is preferable that the timing of the control unit changing the set acceleration is the time when a switch of a blinker is switched on to each of the turning directions. By doing so, the acceleration can be changed only at that time by simple operation of the driver.

Further, in the present invention, in a case where the control unit judges during running that braking operation of the self-car is necessary due to occurrence of some event, the control unit automatically operates a braking mechanism so as to generate a magnitude of deceleration larger than a minimum necessary magnitude of deceleration within a range not affecting health of passengers of the car if a driver does not make any braking operation within a preset time period from occurrence of the judgment. By employing the apparatus for controlling run of a car constructed as described above, if the driver neglects braking operation when the braking operation is required, or if the braking operation is delayed, a warning can be made on the driver by giving a light shock by generating a magnitude of deceleration larger than a minimum necessary magnitude of deceleration within a range not affecting health of the driver. Thereby, the driver will not feel like having such operation of the apparatus any more, and the driver, accordingly, comes to not neglect braking operation. This results in improvement of safety.

Further, the present invention is characterized by an apparatus for controlling run of a car which further comprises a remaining fuel quantity measuring means for measuring a quantity of remaining fuel; and a road inclination measuring means for measuring an inclination of a road based on a difference between a measured result of the remaining fuel quantity measuring means measured at a position of horizontal road and a measured result of the remaining fuel quantity measuring means at present time. Thereby, there is no need to newly add a sensor for measuring inclination by measuring an inclination of a road using a remaining fuel meter attached to any car, which can prevent cost increase. A driving force and a braking force necessary for controlling the car can be calculated using the inclination measured as described above.

Further, the present invention is characterized by an apparatus for controlling run of a car further comprising an inclination measuring means for measuring an inclination of a road; a gear position calculating means for calculating a gear position at braking using an auxiliary baking means based on the inclination of the road measured by the inclination measuring means, and a speed, characteristic data of a power source, a present gear position and an acceleration of the car; and an auxiliary brake braking force calculating means for calculating a braking force by an auxiliary brake means based on a calculated result of the gear position calculating means, wherein when a braking force is generated corresponding to an operating amount or an operating force of the first pedal, a shortage quantity of braking force of only the auxiliary brake means is generated using a main brake means after the time when a target braking force becomes larger than a calculated result of the auxiliary brake braking force calculating means. Thereby, when the driver steps on the first pedal in order to perform braking operation, frequency of using the friction brake can be reduced and accordingly the burden acting on the brake pads can be reduced if the braking force is within a range of the braking force capable of being generated by the engine brake. At the same time, an amount of fuel consumption can be suppressed because fuel is not injected during engine braking.

Further, the present invention is characterized by an apparatus for controlling run of a car further comprising a road inclination measuring means for measuring an inclination of a road; and a braking force holding means for holding a braking force, wherein braking force held at stopping the car is increased larger as an absolute value of the inclination of road is larger when the car is stopped, and the braking force is held by the braking force holding means even if the operating amount or the operating force of the first pedal is decreased until the car is restarted. Thereby, the car can be safely started without moving backward until the car is restarted because the brake oil pressure is maintained when the car is stopped, for example, when the car is stopped on an ascending slope even if the stepping amount of the first pedal is decreased.

Further, the present invention is characterized by that the braking force holding means eliminates the held braking force when a speed-change mode selecting means is changed from a driving mode to a parking mode. Even in a case where the car is stopped on an ascending slope and the braking force is held as described above, if the mode is changed from the driving mode to the parking mode, the car can not be moved backward because the gear is locked. Therefore, in that case, the braking force is released. By doing so, the energy used for the braking can be saved.

Further, the present invention is characterized by that the braking force holding means eliminates the held braking force when a speed-change mode selecting means is changed to a driving mode. When the car is stopped on an ascending slope, it is considered that the car is stopped by using a side brake without setting the parking mode. At that time, the braking force is being maintained during parking. In that case, the car can be safely started by setting the held braking force so as to be released when the mode is changed to the driving mode.

Further, the present invention is characterized by that the speed-change mode selecting means is changed to the driving mode in order to starting the car, a driving force is generated so that the car is moved down backward if it is judged from a measured result of the inclination measuring means that the car is stopped on an ascending road. When the car is stopped on a steep ascending slope and restarted just after releasing the held braking force by loosening stepping of the first pedal, it is considered that the car is sometimes moved backward due to a time lag until the driving force is transmitted, which is dangerous. In that case, if the mode is switched to the driving mode and at the same time the throttle is modified corresponding to the inclination, as in the present invention, the car can safely restarted without being moved backward because a driving force enough to prevent the car from moving backward is generated even if stepping of the pedal is loosened.

Further, the present invention is characterized by the apparatus for controlling run of a car further comprising a friction member temperature measuring means for measuring a temperature of a friction member of a main brake means; and a target braking force modifying means for modifying a target braking force based on the temperature of the friction member measured by the friction member temperature measuring means.

Thereby, the braking force of the main braking means can be appropriately generated based on the temperature of the friction member of the main braking means, and accordingly a stable braking force can be obtained irrespective of the temperature.

DESCRIPTION OF THE PREFERRED EMBODIMENTS

Figure 1:
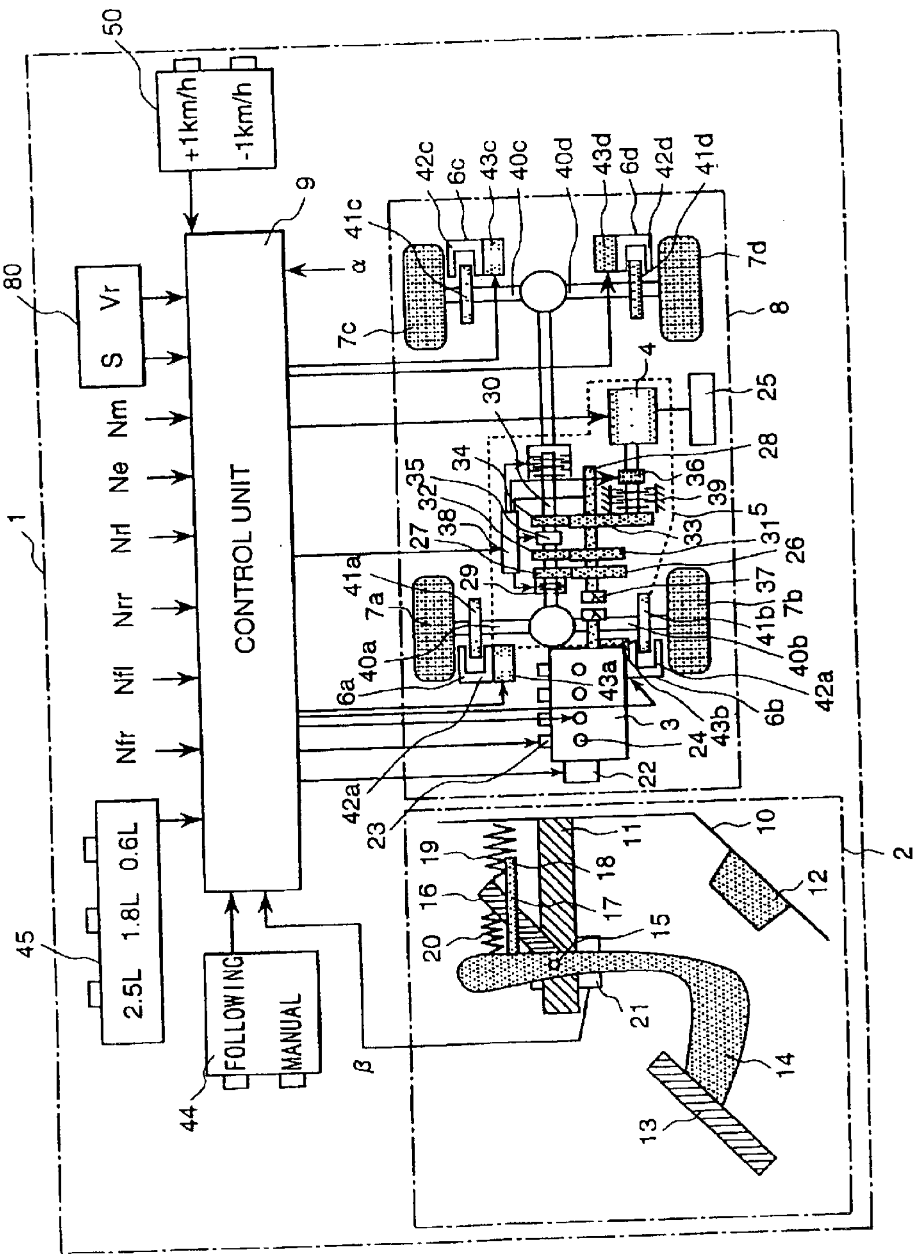
FIG. 1 is a functional block diagram showing an embodiment of a car in accordance with the present invention.

FIG. 1 is a functional block diagram showing an embodiment of a car in accordance with the present invention.

The car 1 is equipped with a braking and driving system 8 composed of a brake operating mechanism 2, an engine 3, a transmission 5 including a motor 4, brake units 6*a* to 6*d* and tires 7*a* to 7*d*; and a control unit 9 for controlling the braking and driving system 8 corresponding to input signals (to be described later).

The brake operating mechanism 2 will be described first. A support portion 11 and a stopper 12 are attached to the body 10 of the car 1. In the support portion 11 attached to the body 10, a rotary shaft 15 fixed to a first lever 14 operated by a brake pedal 13 is rotatably supported to the support portion 11. Further, a second lever 16 rotatable to the rotary shaft 15 is provided.

When the second lever 16 comes in contact with a hook 18 of a member 17 attached to the first lever 14 by operating the brake pedal 13, the second lever 16 is operated. A first pedal reaction force mechanism (a return spring) 19 is provided between the second lever 16 and the body 10. A second pedal reaction force mechanism (a return spring) 20 is also provided between the first lever 14 and the second lever 16, and a reaction force of the first reaction force mechanism 19 is set larger than a reaction force of the second reaction force mechanism 20.

That is, when a driver (not shown) operates the brake pedal 13 with a force stronger than the reaction force of the second reaction force mechanism 20 and weaker than the reaction force of the first reaction force mechanism 19, the second lever 16 is not operated and only the first lever 14 is operated. Accordingly, the hook 18 of the member 17 and the second lever 16 are stopped in contact with each other. Here, "the second lever 16 is not operated" does not mean that the second lever 16 is not moved, but means that the second lever 16 is allowable to be slightly moved unless the braking force is generated.

Then, when the driver operates the brake pedal 13 so as to overcome the reaction force of the first reaction force mechanism 19, the hook 18 and the second lever 16 in contact with each other are rotated together, and operated until the first lever 14 comes in contact with the stopper 12.

A brake pedal operating amount sensor 21 for detecting a rotating angle of the rotary shaft 15 is attached to the second lever 16, and outputs an operated amount until the hook 18 of the member 17 comes in contact with the second lever 16 and an operated amount until the first lever 14 comes in contact with the stopper 12.

Although description will be made here on an example of using the brake pedal operating amount sensor 21 for detecting an operating amount of the brake, a brake operating force (stepping force) sensor for detecting a stepping-on force (stepping force) on the brake pedal 13 may be used.

Next, description will be made below on the braking and driving system 8 composed of the engine 3, the transmission 5 including the motor 4, the brake units 6*a* to 6*d* and the tires 7. The engine 3 comprises an electronic control throttle 22 for controlling an amount of intake air, a fuel injection valve 23 for supplying an amount of fuel matching with the amount of intake air so as to attain a target air-fuel ratio (an amount of intake air/an amount of supplied fuel) and an igniter 24 for performing efficient combustion in the engine 3.

Although description is made here in an example of using a gasoline engine, the other kinds of engines such as a diesel engine, a gas turbine and the like may be applicable. Further, there are in practical use various kinds of gasoline engines such as a port fuel injection engine in which fuel is injected into the intake pipe, an in-cylinder fuel injection engine in which fuel is directly injected into the cylinders and a mirror engine in which the intake valves and the exhaust valves are electronic-controlled in order to improve the combustion efficiency. Any type of them may be applied without problem. However, it is no need to say from the viewpoint of global environmental safeguard that an engine compatible between reducing of fuel consumption and reducing of gas emission is most suitable.

The transmission 5 is an automatic transmission with the motor 4 which is formed based on a transmission of a double-shaft and always-engaged type. The motor 4 has a generator function, and outputs kinetic energy by receiving electric energy from a battery 25 to perform starting operation of the engine 3 and driving the tires 7, and receives kinetic energy generated by energy recovery and converts it into electric energy to store it in the battery 25.

When the car runs at a high speed, output torque of the engine 3 and the motor 4 is transmitted to the tires 7 by a high speed drive gear 26 and a high speed driven gear 27. The high speed drive gear 26 is fixed to a transmission input shaft 4. The high speed driven gear 27 can be linked with and detached from a transmission output shaft 30 by a gear switching assist clutch 29.

Similarly, when the car runs at an intermediate speed and at a low speed, output torque of the engine 3 and the motor 4 is transmitted to the tires 7 by an intermediate speed drive gear 31, a low speed drive gear 33 and an intermediate speed driven gear 32, a low speed driven gear 34. The intermediate speed drive gear 31 and the low speed drive gear 33 are fixed to the transmission input shaft 4. Switching between the intermediate speed driven gear and the low speed driven gear and linking and releasing of the motor 4 are performed a first dog clutch 35 and a second dog clutch 36, respectively.

It is known that these dog clutches are generally small in sliding loss at linking and high in transmission efficiency. When the gear is switched particularly between intermediate speed and low speed, the torque of the engine 3 or the motor 4 is not transmitted to the transmission output shaft 30 to cause a transmission shock (decrease of torque). Therefore, torque is transmitted through the high speed gear series by performing sliding controlling of the gear switching assist clutch 29.

Further, the engine 3 needs to be detached from the transmission when the car is driven only by the motor 4, and the engine 3 needs to be linked with the transmission when the car is started by the engine 3. Therefore, a starting clutch 37 is arranged in the transmission input shaft 28. A so-called dry clutch may be employed as the starting clutch 37, and in the dry clutch the torque can be transmitted by putting and pressing a clutch disk between a flywheel (not shown) and a pressure plate (not shown).

Operation of all the clutches are performed by an oil actuator 38. A clutch of known type such as a wet type multi-plate clutch, an electromagnetic clutch may be arbitrarily employed for each of all the clutches.

Although the oil actuator is used for operating the clutch in this embodiment, an electric actuator such as an ultrasonic motor, a DC motor or an AC motor may be used.

Further, the transmission 5 has a brake clutch 39 for stopping the car.

The brake units 6*a* to 6*d* comprise brake disks 41*a* to 41*d* fixed to the wheels 40*a* to 40*d*, calipers 42*a* to 42*d* with a brake pad (not shown) and brake drive motors 43*a* to 43*d*. In the brake units 6*a* to 6*d*, the friction coefficient between the brake disks 41*a* to 41*d* and the brake pads is largely varied by change of the environment such as rain fall, long unused condition and so on. Therefore, performance of following distance control auto-cruise at a low speed and at stopping is decreased, and smooth stopping and an accuracy of target following distance become difficult to be compatible with each other.

On the other hand, the friction coefficient in the brake clutch 39 provided in the transmission 5 less changes even if the environment changes, and accordingly, good performance of following distance control auto-cruise at a low speed and at stopping can be attained.

The control unit 9 for controlling the brake driving mechanism 8 will be described below.

The control unit 9 is composed of a control units (not shown) for controlling the engine 3, the transmission 5 and the brake units 6*a* to 6*d* and a control unit (not shown) for managing the whole brake drive system 8, and the units are connected with one another so as to communicate through a network.

The control unit 9 receives a signal β of the brake pedal operated amount sensor 21, a signal of a run mode setting switch 44, a signal of a driving force (acceleration) setting switch 45, a signal α of an accelerator pedal operated amount sensor, a front-right wheel rotation sensor signal Nfr, a front-left wheel rotation sensor signal Nfl, a rear-right wheel rotation sensor signal Nrr, a rear-left wheel rotation sensor signal Nrl, an engine rotating speed signal Ne, a motor rotating speed signal Nm, a following distance signal S and a relative speed signal Vr between the self-car and the preceding car obtained from a milli-wavelength radar system 80, and a signal of a speed setting switch 50 by which the driver himself can set a target speed.

Then, the control unit 9 realizes acceleration, deceleration, starting, stopping and constant-speed running if the car by controlling the engine 3, the transmission 5 and the brake units 6*a* to 6*d* based on the input signals.

Figure 2:
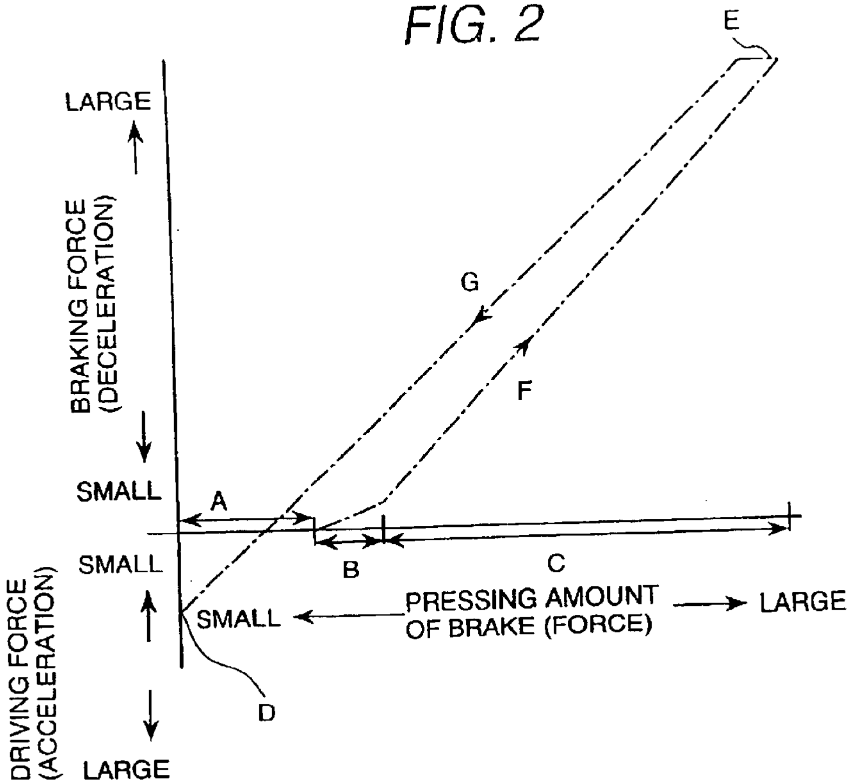
FIG. 2 is a graph showing the relationship of braking and driving forces versus pressing amount of a brake (force).

The function of the brake operating mechanism 3 will be described below, referring to a graph of FIG. 2 showing the relationship of braking and driving forces versus pressing amount of a brake (force) and the control flowchart of FIG. 3. In Step 60 of FIG. 3, the control unit 9 executes control processing by receiving a signal β of the brake pedal operated amount sensor 21, a signal of the run mode setting switch 44, a signal of the driving force (acceleration) setting switch 45, a signal α of the accelerator pedal operated amount sensor, a front-right wheel rotation sensor signal Nfr, a front-left wheel rotation sensor signal Nfl, a rear-right wheel rotation sensor signal Nrr, a rear-left wheel rotation sensor signal Nrl, an engine rotating speed signal Ne, a motor rotating speed signal Nm, a following distance signal S and a relative speed signal Vr between the self-car and the preceding car obtained from the milli-wavelength radar system 80, and a signal of the speed setting switch 50 by which the driver himself can set a target speed, as described above. Although a car speed No used in the control processing is calculated based on the average value of the front-right wheel rotation sensor signal Nfr, the front-left wheel rotation sensor signal Nfl, the rear-right wheel rotation sensor signal car speed No may be obtained using a separate car speed sensor.

The object of the present invention is to realize starting and stopping of a car without detaching a driver's foot from the brake pedal 13. That is, it is assumed that the following made (the following distance control auto-cruise) is set to the running mode switching switch 44 (when the judged result in Step 61 of the processing of FIG. 3 is "Y").

Firstly, a footrest function rage (a range A in FIG. 2) is provided as one of the functions of the brake operated amount. That is, the reaction force of the second pedal reaction force mechanism 20 is set to a value smaller than a force of a load of the brake pedal (the brake pedal 13+the first lever 14 up to the rotary shaft 15) added with a load of the driver's foot. On the other hand, the reaction force of the first pedal reaction force mechanism 19 is set to a value larger than the force of a load of the brake pedal added with the load of the driver's foot. By doing so, the driver's burden at performing the following distance control auto-cruise (acceleration, constant speed running) can be reduced because the braking force is not produced if the driver puts his foot on the brake pedal 13.

After that, when the speed of the car needs to be slowly decreased (a range B in FIG. 2), the driver pushes in the brake pedal 13 so as to overcome the reaction force of the first pedal reaction force mechanism 19. In the range B of FIG. 2, a driving force reducing function is executed. That is, the engine brake is worked by setting the engine torque in the idling state or controlling the gear ratio.

Further, as shown in FIG. 1, in the car mounting the motor 4 (HEV: the hybrid vehicle), the car speed may be slowly decreased by recovering energy using the motor 4.

When the operating amount of the brake pedal 13 is further increased (a range C in FIG. 2), the brake units 6*a* to 6*d* (the brake clutch 39) are operated to obtain a large braking force (deceleration).

Figure 3:
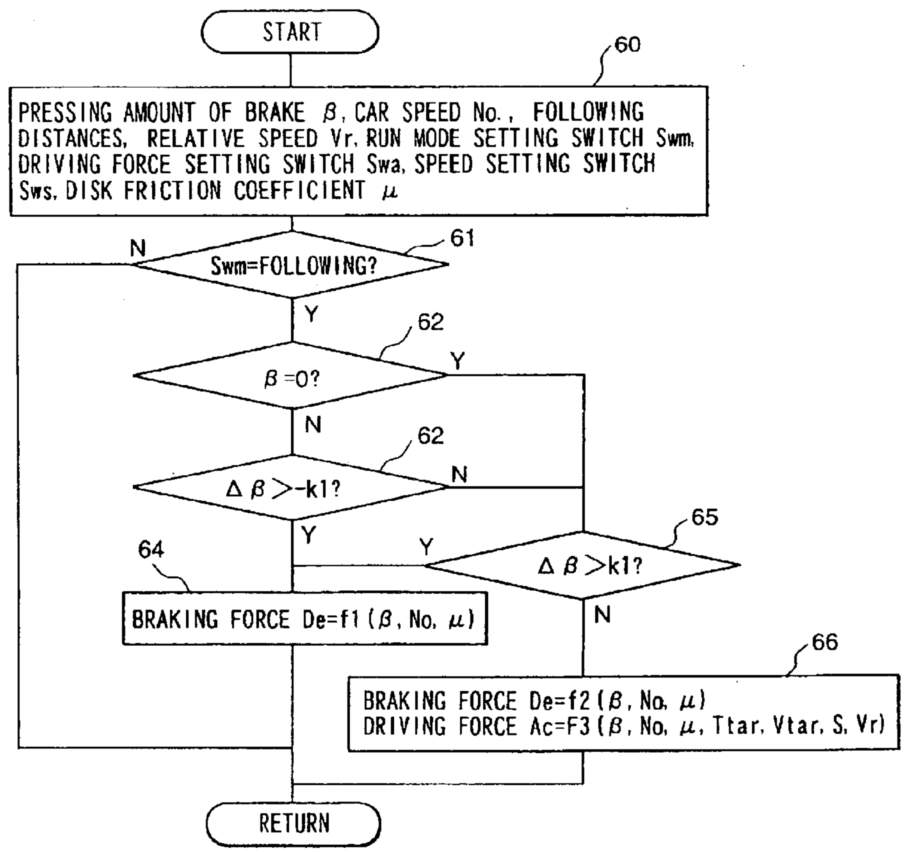
FIG. 3 is a flowchart of a control process executed by a control unit.

The braking force described above is expressed by a braking force increasing line passing on the line F (when the judged result of the processing of Step 62 of FIG. 3 is "N"). The braking on the line F is executed when the brake operating amount β is not zero and at the same time the value Δβ (a precedent β−present β) in the processing of Step 63 is larger than a value changing to a preset line G (−k1: k1 is a positive value) (when there is no change to the line G). In the processing of Step 64, a target braking force De is calculated using a function f1 of the brake operating amount β, the car speed No and the friction coefficient $\mu$ between the brake pad and the disk.

The case where the value Δβ becomes smaller than −k1 in the processing of Step 63, that is, the case the braking force is transferred to the line G will be described below.

In that case, the processing proceeds to the processing of Step 65. When the value Δβ is smaller than a value changing to a preset line F (−k2: k2 is a positive value), the processing proceeds to the processing of Step 66. In the processing of Step 66, a target braking force De is calculated using a function f2 of the brake operating amount β, the car speed No and the friction coefficient $\mu$ between the brake pad and the disk on the base on the line G in the ranges of B and C.

On the other hand, in the range A of FIG. 2, a target driving force Ac is calculated using the brake operating amount β, the car speed No, a target driving force Ttar set by the driving force setting switch 45, a target maximum speed Vtar set by the speed setting switch 50 and a function f3 of the brake operating amount β, the car speed No and the friction coefficient $\mu$.

The gradients of the line F and the line G and so on may be arbitrarily set by the driver. Therefore, it is possible to realizing acceleration and deceleration feeling which the driver wants to have. The maximum braking force does not changed because of safety priority.

Figure 4:
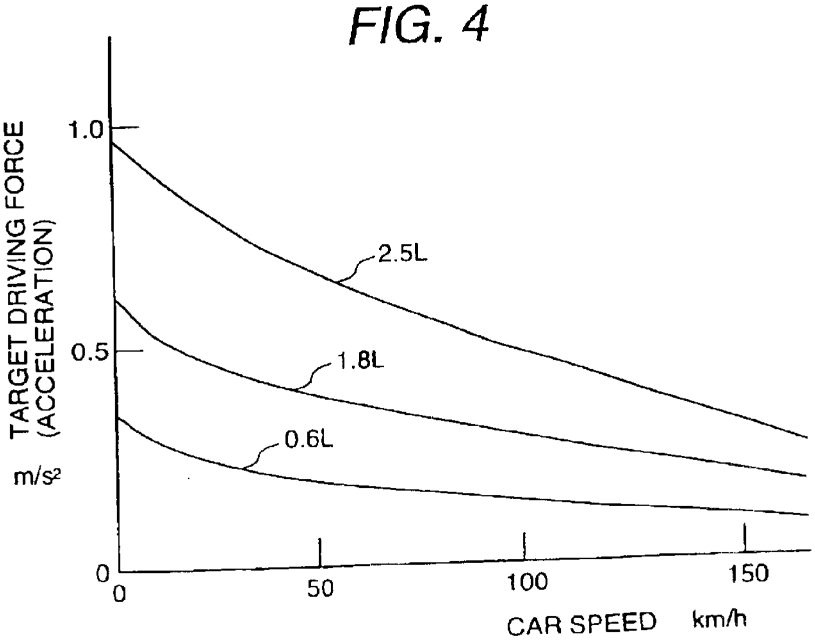
FIG. 4 is a graph showing a target driving force set by a driving force setting switch.

FIG. 4 shows a target driving force (acceleration) set by the driving force setting switch 45. In the characteristics, it is assumed the case where there is no preceding car, that is, the case of the car speed constant control (cruise control). Further, the target driving force is changed corresponding to the car speed, and in a case of an engine of 2.5 L displacement three kinds of the target driving force characteristics (for example, 2.5 L: maximum driving force, 1.8 L. 0.6 L) can be selected.

These driving force characteristics can be set according to change in road environment such as highway, mountain road, town area which can be obtained from the infrastructure information·HEO (Hyper-Elliptic Orbit) system such as the navigation·VICS (Vehicle Information and Communication System).

Figure 5:
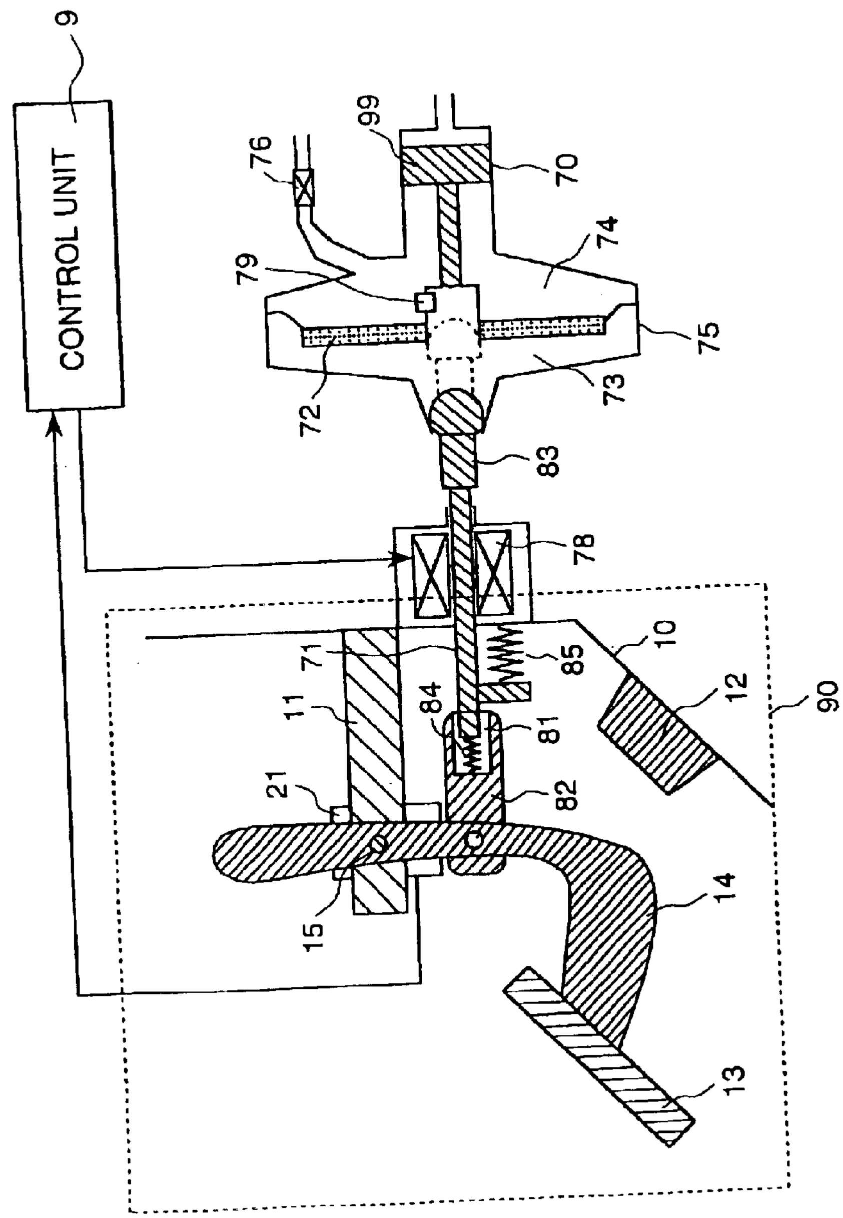
FIG. 5 is a schematic view showing an embodiment of a brake operating mechanism which is constructed based on an oil brake system.

FIG. 5 shows an embodiment of a brake operating mechanism 2 which is constructed based on an oil brake system. The brake control in the system described above is of a so-called BBW (Brake By Wire) in which the brake operating amount (force) of the brake pedal 13 is input to the control unit 9 and the target braking force is calculated in the control unit 9 to operate the brake units 6*a* to 6*d*. On the other hand, in the system shown in FIG. 5, an oil brake conventionally existing is used. The basic portion of a brake operating mechanism 90 has the same construction as that of the brake operating mechanism 2 shown in FIG. 1, and accordingly overlapping explanation will be omitted here. Description will be made here on an embodiment in which the brake operating mechanism 90 is added to an oil brake system for braking the car by generating oil pressure by drive of a master cylinder 70.

An operating rod 71 (a pedal side rod 82, a brake side rod 83) horizontally operated corresponding to operation of the brake pedal 13 is attached to the first lever 14 of the brake operating mechanism 90. A cylinder drive unit 75 which is divided into two chambers (a first chamber 73 and a second chamber 74) are arranged in the top front portion of the operating rod 71.

The second chamber 74 is connected to an intake pipe (not shown) of the engine through a check valve 76, and becomes in a negative pressure when the engine is started to be operate. A hole 79 is formed in the diaphragm 72 separating the first chamber 73 and the second chamber 74 to make the pressures of the two chambers equal to each other. Therefore, a piston 99 of the master cylinder 70 is stopped.

When the driver steps on the brake pedal 13, the operating rod 71 is moved toward the right hand side in FIG. 5 to make a gap between the top front portion of the brake side rod 83 of the operating rod 71 and the cylinder drive unit 75. Further, as shown by the dashed line, the brake side rod 83 of the operating rod 71 comes in contact with the diaphragm 72 to block movement of air through the hole 79 as the result. Therefore, the pressure in the first chamber 73 becomes atmospheric pressure to move the diaphragm 72 toward the right hand side by a pressure difference to the second chamber 74 and consequently to increase the oil pressure of the master cylinder 70 by operation of the piston 99. Thereby, the driver can operates the brake with a small brake operating force.

In addition, a proportional solenoid 78 is arranged in the operating rod 71 to automatically operate braking by a signal from the control unit 9.

Further, a delay mechanism 81 is provided so that a gap is not formed between the top front portion of the operating rod 71 and the cylinder drive unit 75 with in the brake operating range A shown in FIG. 2. The delay mechanism 81 has a third pedal reaction force mechanism 84 between the pedal side rod 82 and the brake side rod 83. Further, a fourth pedal reaction force mechanism 85 is provided in the brake side rod 83.

The reaction force of the third pedal reaction force mechanism 84 is set to a value smaller than a force of a load of the brake pedal (the brake pedal 13+the first lever 14 up to the rotary shaft 15+the pedal side rod 82) added with a load of the driver's foot. On the other hand, the reaction force of the fourth pedal reaction force mechanism 85 is set to a value larger than the force of a load of the brake pedal added with the load of the driver's foot. By doing so, the driver's burden at performing the following distance control auto-cruise (acceleration, constant speed running) can be reduced because the braking force is not produced if the driver puts his foot on the brake pedal 13 (the footrest function).

That is, in this embodiment similarly to the embodiment shown in FIG. 1, starting and stopping of the car can be performed without releasing the driver's foot from the brake pedal 13.

Figure 6:
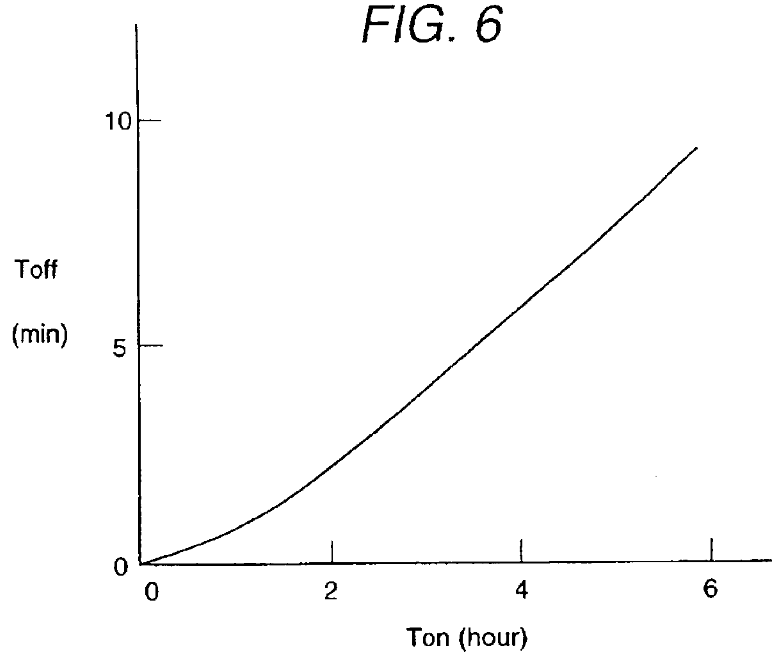
FIG. 6 is a graph showing a switching method from a following mode to a manual mode.

FIG. 6 is a graph showing a switching method from a following mode to a manual mode. In the present invention, switching between the following mode and the manual mode can be performed by setting a running mode setting switch input to the control unit 9.

In general, when human continuously perform one action and after getting used to performing the one action performs another action, it take a long time for him to get used to performing the another action. Therefore, when the mode is suddenly switched to the manual mode after driving with the following mode for a long time, there is a possibility that the driver performs erroneous operation because he can not completely get out of the driving feeling of the previous running mode, which is dangerous.

Therefore, as shown in FIG. 6, the time (Toff) from the following mode switch switched OFF to the following mode actually switched OFF is varied corresponding to an ON time length of the following mode (Ton). That is, the time Toff is set longer when the time of the following mode is long, and driving assistance in the following mode is continued during the period set to the time Toff. On the other hand, when the mode is switched from the manual mode to the following mode, the time from the manual mode switch switched OFF to the manual mode actually switched OFF may be shorter than the time Toff (including time zero) because it is switching to safe driving control.

By doing as described above, occurrence of erroneous operation of the driver at switching to the manual mode after long driving of the following mode can be reduced and accordingly a safe switching of the mode can be attained.

Figure 7:
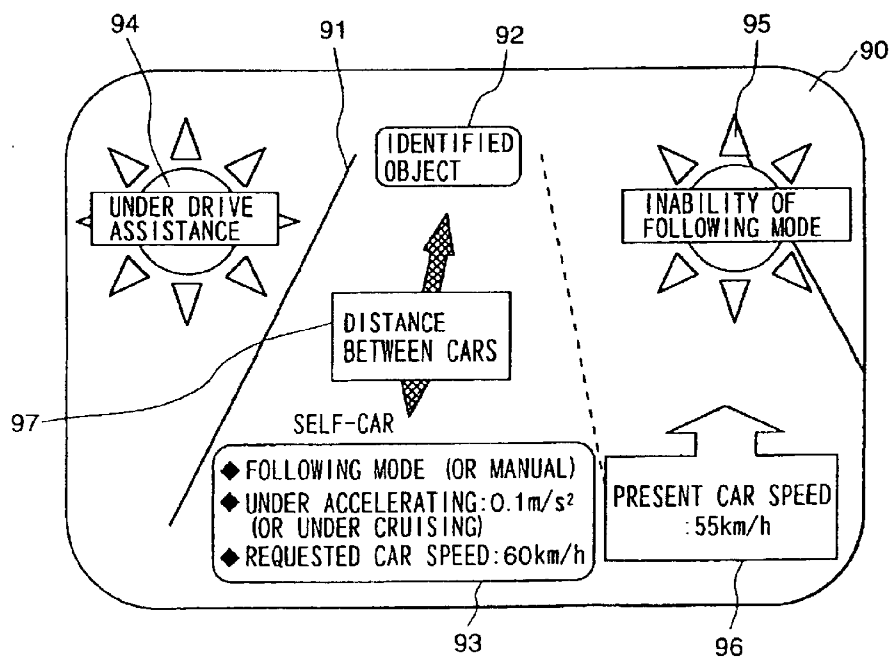
FIG. 7 is a view showing an example of displayed contents.

FIG. 7 is a view showing an example of displayed contents. In a case where there are a plurality of running modes such as the following mode, the manual mode and so on, the driver will become uneasy if he can not recognize which running mode is being performed now, whether the system is actually operated without any trouble and so on.

Therefore, it is preferable that a display portion 90 is arranged in a dashboard (not shown) in front of the driver's seat, and the contents shown in FIG. 7 is displayed to give the driver a sense of security. In the display portion 90, a running road 91, an identified object 92 (a car or the like) ahead of the self-car, the self-car 93, a present running mode 94, trouble contents 95, a following distance to the preceding object 97 and a present car speed 96 and so on are displayed.

In regard to the display of the following distance 97, a sense of security can be given to the driver if the visual measurement of the driver agrees with a distance detected by a radar or the like.

Next, the driver wants to know in what conditions the self-car is driven. In the display of self-car 93, it is preferable to display, for example, a running mode (following or manual) set by the driver, under acceleration, under constant speed running or under following an object ahead of the self-car, and actual values of these operating conditions.

Further, during brake operation, it is also important that the driver is informed of whether or not it is in a dangerous running condition by displaying whether the driver assistance is being performed or not. Further, it is preferable that a sign of inability of switching to the following mode is displayed in a failure content 95 when the control system has failed. If the display of failure content 95 is not provided, there is a danger that the driver excessively depends on the driving assistance system and misunderstands that the hollowing mode has been set when the driver operates to set the running mode setting switch 44 to the following mode.

The display is necessary for performing communication between the driver and the machine (car), and is one of important means to give the driver a sense of security and to drive safely.

The description has been made on the embodiment of the present invention by taking the following distance control auto-cruise system in which a preceding car or an obstacle is detected and a distance between the self-car and the object ahead of the self-car is safely kept.

However, the system realizing braking and driving by one pedal in accordance with the present invention can be also applied to the car-speed constant control (auto-cruise) in actual use. That is, the different point of the present invention from the conventional system is that the object ahead of the self-car is detected. In the car-speed constant control without detecting an object ahead of the self-car, the driver performs setting of a target acceleration and a target speed corresponding to behavior of the object ahead of the self-car and operating braking force setting using the brake operating mechanism 2 by himself.

Figure 8:
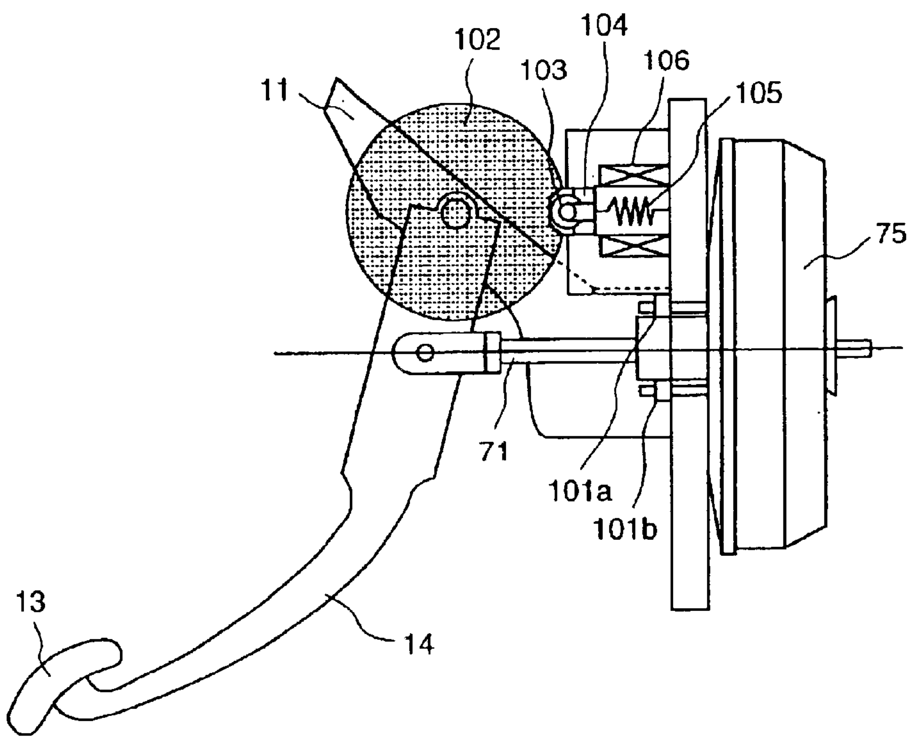
FIG. 8 is a side view showing another embodiment of a footrest apparatus of a brake pedal including a mechanical stopper mechanism in an apparatus for controlling run of a car in accordance with the present invention.

FIG. 8 is a side view showing another embodiment of a footrest apparatus of a brake pedal including a mechanical stopper mechanism in an apparatus for controlling run of a car in accordance with the present invention.

The footrest apparatus shown in FIG. 8 is composed of a brake pedal 13, a first lever 14, a support portion 11, an operating rod 71, a cylinder drive unit 75, bolts 101*a*, 101*b*, a disk 102, a roller stopper 103, a magnetic body 104, a pressing spring 105 and a solenoid 106. Therein, the brake pedal 13, the first lever 14 and the disk 102 are integrated in a unit, and the disk 102 has a groove in the outer periphery so as to engage with the roller stopper 103.

As shown in FIG. 8, the roller stopper 103 is pushed into the groove of the disk 102 by the pushing spring 105 through the magnetic body 104 when the footrest apparatus is operated. By adjusting the pushing force and the shape of the groove, movement of the brake pedal 13 can be controlled until the force acting on the brake pedal 13 by putting the driver's foot on the brake pedal reaches a certain value. When the force acting on the brake pedal 13 exceeds the certain value, the disk 102 is rotated because a rotating force of the disk 102 overcomes the pushing force of the roller stopper 103. Therefore, the brake pedal 13 becomes rotatable, and the operating rod 71 linked with the disk through a pin in one piece is moved to generate a braking force. At an emergency, the roller stopper 103 is detached from the groove of the disk 102 by conducting current to the solenoid 106 to attract the magnetic body so that braking operation can be performed similarly to the normal operation. In a case where the driver is limited, the footrest apparatus need not to be replaced unless it is failed if the spring constant is selected in the beginning. A sliding type stopper such as a vane may be used instead of the roller stopper 103 of a roller type.

Figure 9:
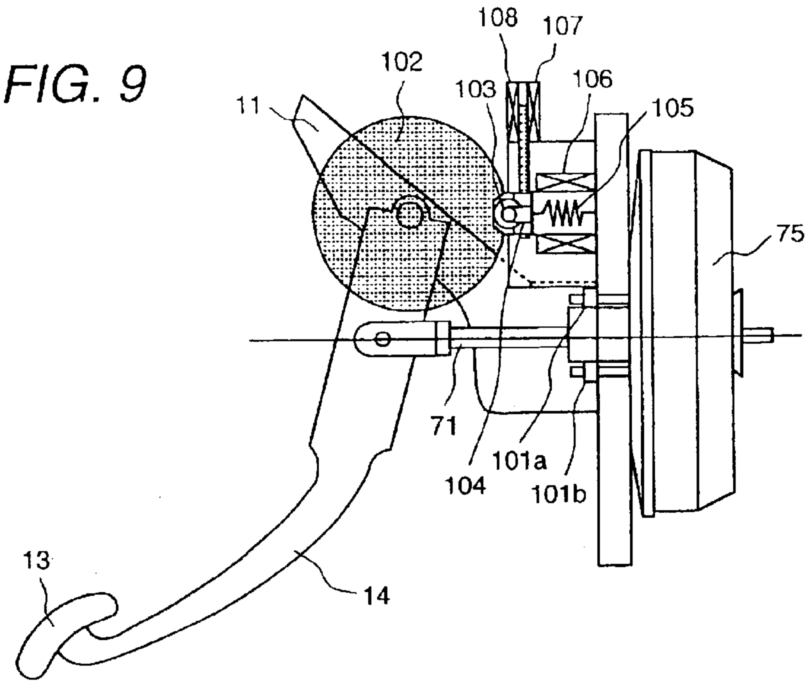
FIG. 9 is a side view showing a modified example of the footrest apparatus in the embodiment in accordance with the present invention shown in FIG. 8.
Figure 10:
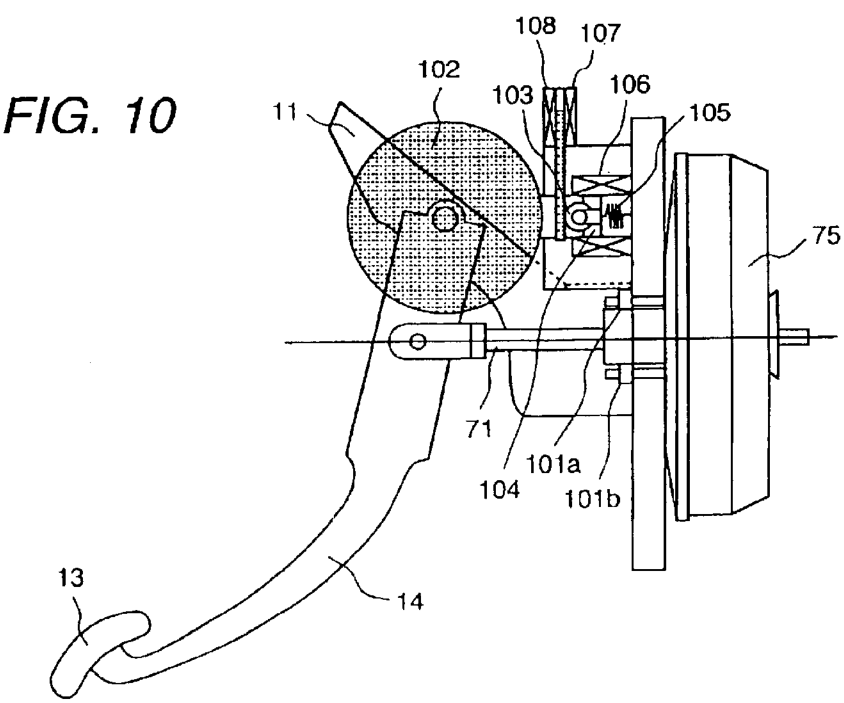
FIG. 10 is a side view showing the modified example of the footrest apparatus in the embodiment in accordance with the present invention shown in FIG. 8.

FIG. 9 and FIG. 10 show a modified example of the footrest apparatus of the brake pedal including a mechanical stopper mechanism in this embodiment of the apparatus for controlling run of a car. In the modified example, a shutter mechanism composed of a shutter 107 and a solenoid 108 is added to the embodiment shown in FIG. 8.

In order to operate the footrest function, the shutter 107 is opened by operating the solenoid 108, as shown in FIG. 9. By doing so, the released roller stopper 103 is pushed by the pushing force of the pushing spring 105 to engaged with the groove of the disk 102, and accordingly the footrest function can be realized.

A method of returning the state of the footrest function to an ordinary feature of the brake pedal shown in FIG. 10 will be described below.

Initially, by operating the solenoid 106 to attract the magnetic body 104, the roller stopper 103 is detached from the groove of the roller stopper 103. When the roller stopper 103 is detached from the groove, the current flowing to the solenoid 108 attracting the shutter 107 is cut. By doing so, the shutter 107 is moved downward by the gravitational force or by a returning spring (not shown) to block a passage of the roller stopper 103. In the manner described above, the state of the footrest is returned to the ordinary feature of the brake pedal. Therein, the disk 102 is not always necessary to be a complete disk, but a member having a curvilinear portion as a part such as an ellipsoidal member or a sectorial member may be used as the disk 102.

Figure 11:
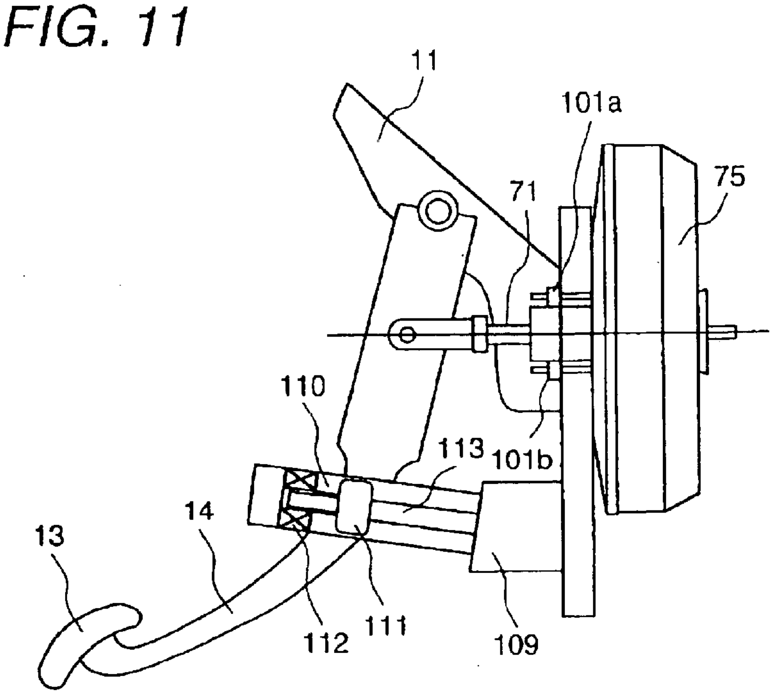
FIG. 11 is a side view showing another embodiment of a footrest apparatus of a brake pedal including a solenoid mechanism in an apparatus for controlling run of a car in accordance with the present invention.

FIG. 11 shows another embodiment of a footrest apparatus of a brake pedal including a solenoid mechanism in an apparatus for controlling run of a car in accordance with the present invention.

The footrest apparatus shown in FIG. 11 is composed of a brake pedal 13, a first lever 14, a support portion 11, an operating rod 71, a cylinder drive unit 75, bolts 101*a*, 101*b*, a base 109, a core 110, a magnetic moving body 111, a solenoid 112 and a guide groove 113.

The core 110 is integrated with the base 109 in a unit, and the magnetic moving body 111 is integrated with the first lever 14 in a unit. When current is not conducted to the solenoid 112, the magnetic moving body 111 is moved by being guided by the guide groove 113 together with movement of the first lever 14.

In order to operate the footrest function, current is conducted to the solenoid. By doing so, a magnetic attracting force is generated to couple the core 110 with the magnetic moving body 111. Therefore, movement of the brake pedal 13 can be controlled until the force acting on the brake pedal 13 by putting the driver's foot on the brake pedal reaches a certain value. When the force acting on the brake pedal 13 exceeds the certain value, the magnetic moving body 111 becomes movable because the force acting on the brake pedal 13 overcomes the attracting force of the solenoid 112. Therefore, the brake pedal 13 becomes movable, and the operating rod 71 linked with the brake pedal through a pin in one piece is moved to generate a braking force. Magnitude of the magnetic attracting force of the solenoid 112 is varied by changing an amount of conducting current so that it can easily cope with change in the force acting on the brake pedal 13, for example, with change of person driving the car.

Figure 12:
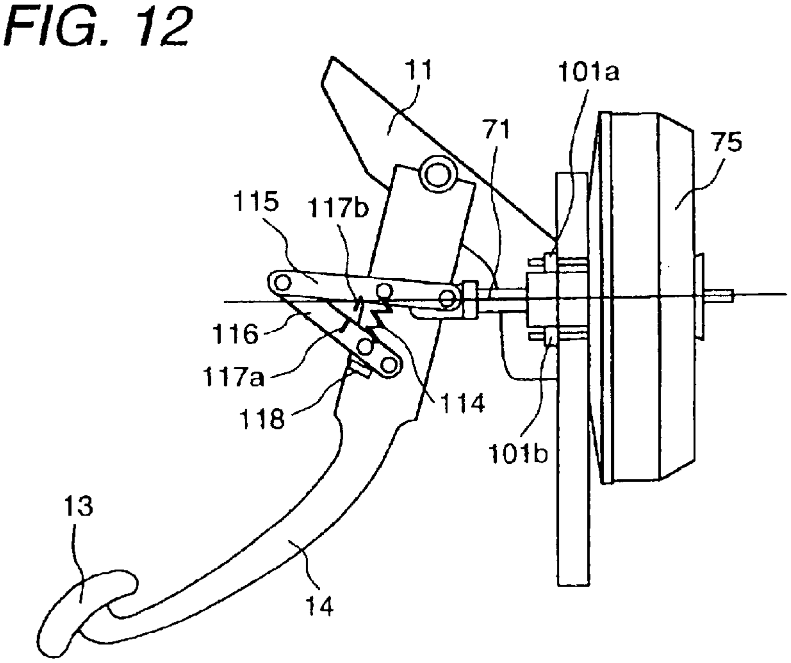
FIG. 12 is a side view showing a further embodiment of a footrest apparatus of a brake pedal including a combination of a spring and crank shafts in an apparatus for controlling run of a car in accordance with the present invention.

FIG. 12 is a side view showing a further embodiment of a footrest apparatus of a brake pedal including a combination of a spring and crank shafts in an apparatus for controlling run of a car in accordance with the present invention.

The footrest apparatus shown in FIG. 12 is composed of a brake pedal 13, a first lever 14, a support portion 11, an operating rod 71, a cylinder drive unit 75, bolts 110*a*, 101*b*, a crank spring 114, a first crank shaft 115, a second crank shaft 116, first stoppers 117*a*, 117*b* and a second stopper 118.

An end portion of the first crank shaft 115 and an end portion of the second crank shaft 116 are rotatably coupled with each other through a pin. The other end of the second shaft 116 is rotatably connected to the first laever 14 through a pin, and the other end of the first crank shaft 115 is rotatably connected to the operating rod 71 through a pin. Further, the crank spring 114 and the first stoppers 117*a*, 117*b* are connected to the two crank shafts 115, 116. Furthermore, the second stopper 118 is also connected to the first lever 14.

When a force is applied to the brake pedal 13 by putting a foot on it, a force is applied to the crank spring because the first crank shaft 115 and the second crank shaft 116 are moved in the directions to geometrically close an angle between the crank shafts with respect to the pin. At that time, the force is hardly added geometrically in the shaft direction of the operating rod 71. Therefore, movement of the operating rod 71 can be limited. When the angle between the crank shafts is closed to a certain degree, the angle can not be closed further more because the stoppers 117*a* and 117*b* come in contact with each other or the second crank shaft 116 and the second stopper 118 come in contact with each other. When the force is further increased, the total force acting on the brake pedal 13 acts in the shaft direction of the operating rod 71. Therefore, the brake operating mechanism is operated similarly to operation of an ordinary brake operating mechanism.

As described above, by appropriately setting the spring constant of the crank spring 114, the brake operating mechanism can be provided with the footrest function. In a case where the driver is limited, the footrest apparatus need not to be replaced unless it is failed if the spring constant is selected in the beginning. Further, the stoppers 117*a*, 117*b*, 118 may be reduced one of them. Number of the crank shafts 115, 116 may be increased to three or more.

Figure 13:
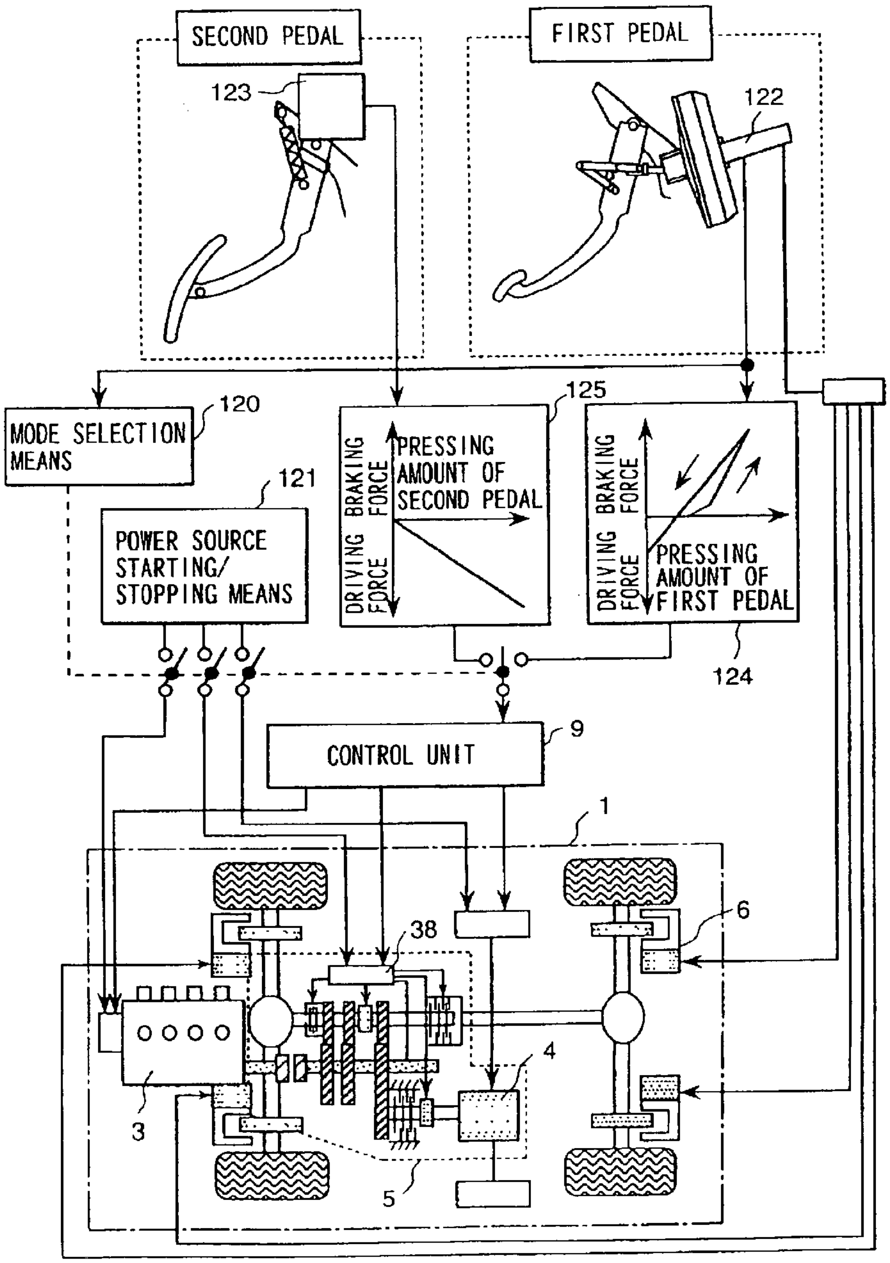
FIG. 13 is a functional block diagram showing another embodiment of a car in accordance with the present invention.

FIG. 13 is a functional block diagram showing another embodiment of a car in accordance with the present invention.

The car 1 is comprises an engine 3, a transmission 5, a control unit 38 for managing the transmission 5, and a control unit 9 for managing the whole of braking units 6 and a drive system 8, and the units are connected with one another so as to communicate through a network.

Further, the car 1 comprises a brake pedal operated amount sensor 122 for the first pedal, a mode selecting means 120, an accelerator pedal operated amount sensor 123 for the second pedal, a power source starting/stopping means 121, a first driving force reference means 124 for calculating a first driving force reference based on the brake pedal operated amount sensor 122, and a second driving force reference means 125 for calculating a second driving force reference based on the accelerator pedal operated amount sensor 123.

When the car 1 is to be driven, the power source (for example, the engine 3 or the motor 4) initially needs to be started operating.

Figure 14:
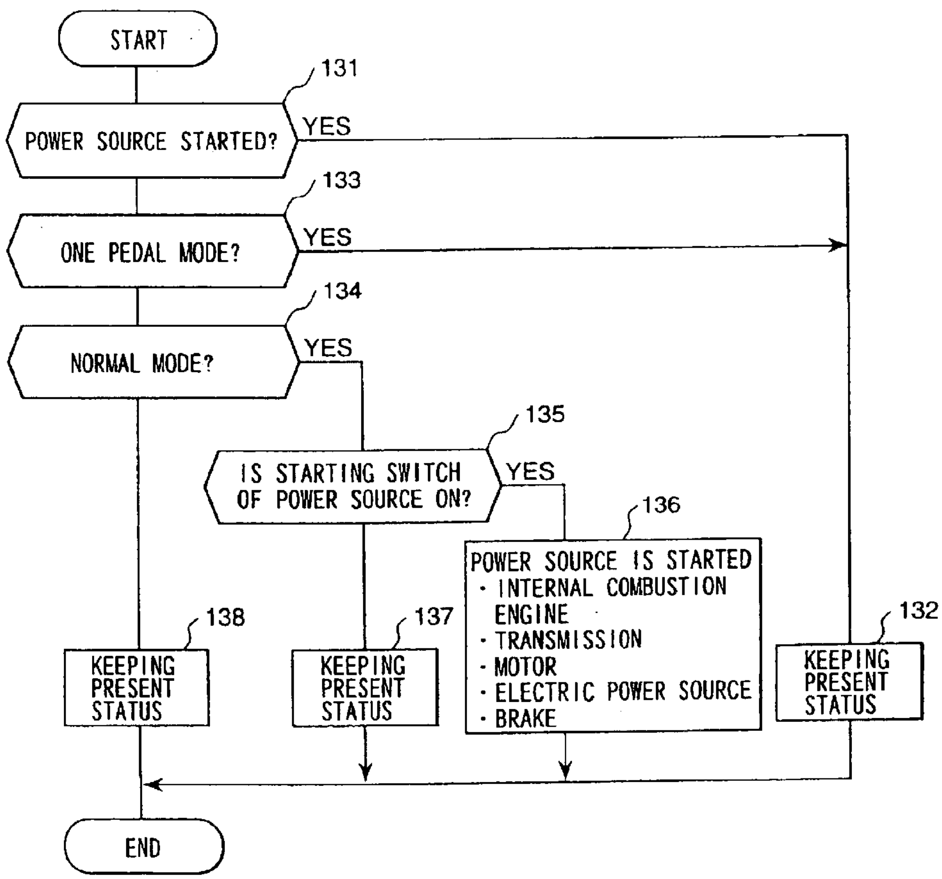
FIG. 14 is a flowchart showing another embodiment of the procedure for starting operation of a power source in accordance with the present invention.

FIG. 14 is a flowchart showing the procedure necessary for starting operation of the power source in the present embodiment. The control unit 9 of the car 1 executes the processing according to the flowchart shown in FIG. 14 every a preset time interval (for example, 100 [ms]).

In the process Step 131, it is judged whether or not the power source (for example, the engine 3 or the motor 4) is started operating. If the power source is started operating, the present status is kept in the process Step 132.

The car 1 functions under at least two modes of the one pedal mode and the normal mode. The driver selects one out of the two modes by operating the mode selecting means 120. In the process Step 133, it is judged whether or not the mode selecting means 120 is the one pedal mode. If the one pedal mode is selected, the present status is kept in the process Step 132. That is, if the one pedal mode is selected when the power source is not started operating, starting of operation of the power source is prohibited.

In the process Step 134, it is judged whether or not the mode selecting means 120 is the normal mode. If the normal mode is selected, in the process Step 143 it is judged whether or not the driver switches on the power source starting/stopping means 121. If the driver switches on, the processing proceeds to the process Step 136 to start operating of the power source mounted on the car 1, for example, the engine 3 or the motor 4. Further, current is supplied to the accelerator pedal operated amount sensor 123 and the brake pedal operated amount sensor 122 which are not the power source but necessary for driving.

If the driver does not switch on the power source starting/stopping means 121, the processing proceeds to the process Step 137 to keep the present status. That is, the power source is not started operating.

If the normal mode is not selected in the process Step 134, it is judged that the mode selecting means 120 is failed and the present status is kept in the process Step 138. That is, the power source is kept in operating if it is operated, and the power source is kept in stopping if it is stopped.

As described above, when the power source is to be started operating, the power source is always started operating after the mode is set to the normal mode. By doing so, it is possible to prevent the car from starting by starting operating the power source when the first pedal is not operated.

Figure 15:
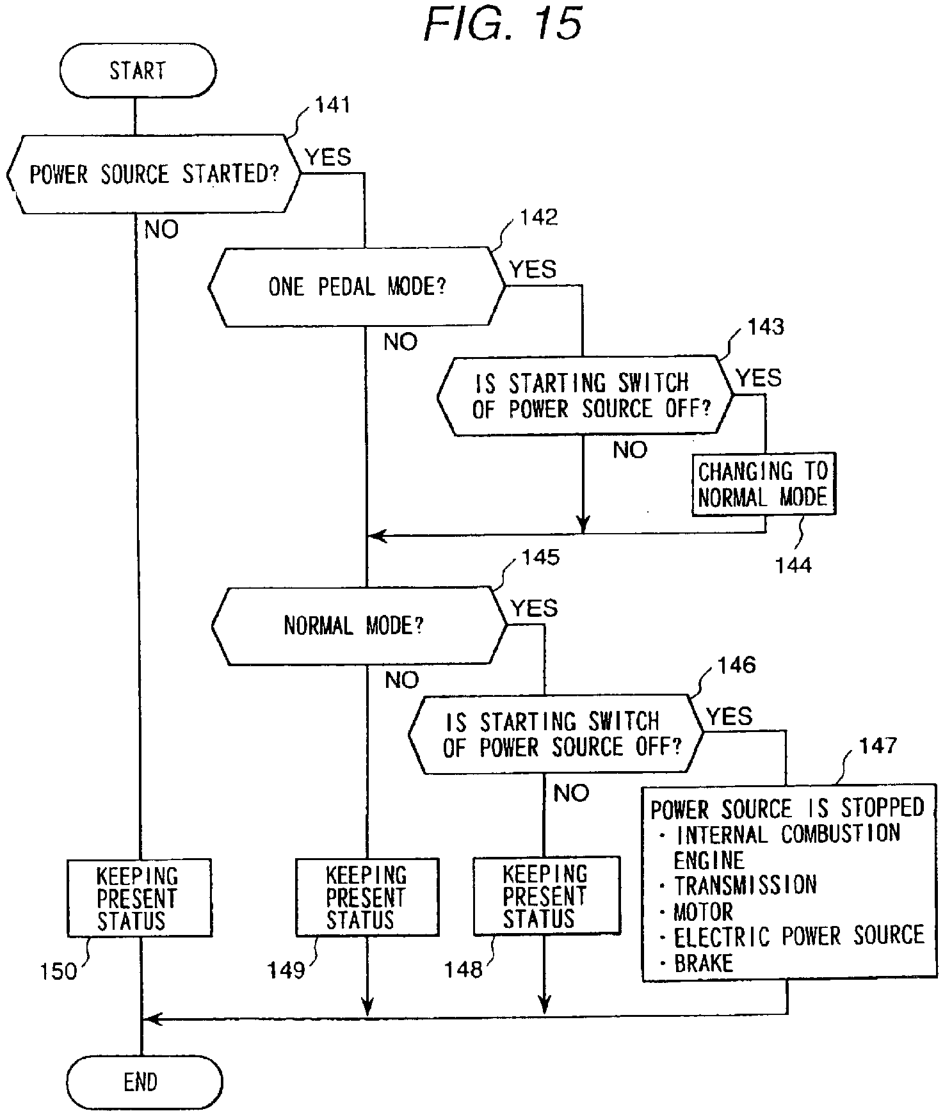
FIG. 15 is a flowchart showing another embodiment of the procedure for stopping operation of a power source in accordance with the present invention.

When the car 1 is stopped, it is necessary to stop operation of the power source (for example, the engine 3 or the motor 4). FIG. 15 is a flowchart showing the procedure for stopping operation of the power source. The control unit 9 of the car 1 periodically executes the processing according to the flowchart shown in FIG. 15 every a preset time interval (for example, 100 [ms]).

In the process Step 141, it is judged whether or not the power source is started operating. If the power source is started operating, the processing proceeds to the process Step 142. If the power source is not started operating, the processing proceeds to the process Step 150 to keep a present status.

In the process Step 142, it is judged whether or not the mode selecting means 120 is the one pedal mode. If the one pedal mode, the processing proceeds to the process Step 143.

In the process Step 143, it is judged whether or not the driver switches off the power source starting/stopping means 121. If the driver switches off, the mode selecting means 120 is changed from the one pedal mode to the normal mode and then the processing proceeds to the process Step 145.

If it is judged in the process Step 142 that the mode selecting means 120 is the normal mode, and if it is judged in the process Step 143 that the driver does not switch off the power source starting/stopping means 121, the processing proceeds to the process Step 145 with keeping the mode in the one pedal mode.

In the process Step 145, it is judged whether or not the mode selecting means 120 is the normal mode. If the normal mode, the processing proceeds to the process Step 146.

In the process Step 146, it is judged whether or not the driver switches off the power source starting/stopping means 121. If the driver switches off, the power sources is stopped operating in the process Step 147. If the driver does not switch off, the present status is kept.

If it is judged in the process Step 145 that the mode selecting means 120 is not the normal mode, it is judged that the mode selecting means 120 is failed and the present status is kept in the process Step 149. That is, the power source is kept in operating if it is operated, and the power source is kept in stopping if it is stopped.

As described above, when the power source is to be stopped operating, the power source is always stopped operating after the mode is set to the normal mode. By doing so, there is an effect that the mode has been always set to the normal mode when the power source is restarted, and accordingly the power source can be immediately started operating when the driver operates the power source starting/stopping means 121.

Figure 16:
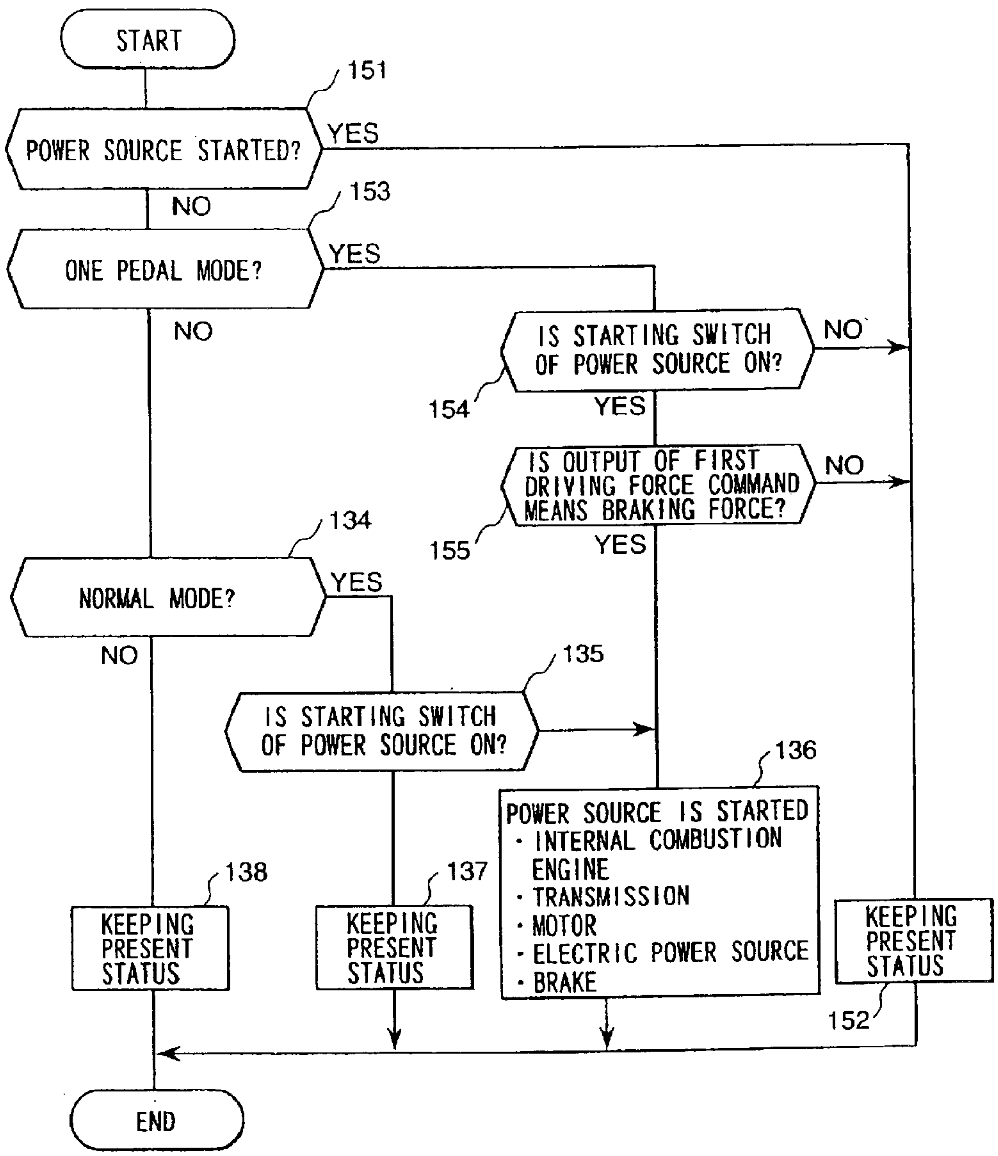
FIG. 16 is a flowchart showing a modified example of the procedure in accordance with the present invention shown in FIG. 14.

FIG. 16 is a flowchart showing a modified example of the procedure necessary for starting operation of the power source in the present embodiment. The basic idea is that in the one pedal mode, operation of the power source can be started when the first pedal is being operated. The control unit 9 periodically executes the processing according to the flowchart shown in FIG. 16 every a preset time interval.

In the process Step 151, it is judged whether or not the power source is started operating. If the power source is started operating, the present status is kept in the process Step 152. If the power source is not started operating, the processing proceeds to the process Step 153 and it is judged whether or not the mode selecting means 120 is the one pedal mode. If the one pedal mode is selected, the processing proceeds to the process Step 154 and it is judged whether or not the driver switches on the power source starting/stopping means 121. If the driver does not switch on, the processing proceeds to the process Step 152 and the present status is kept. That is, the power source is not started operating.

On the other hand, if the driver switches on, the processing proceeds to the process Step 155 and it is judged whether or not the output of the first driving force reference means 124 is a braking force. If the output of the first driving force reference means 124 based on the operated amount of the first pedal is not a braking force (is a driving force), the processing proceeds to the process Step 152 and the present status is kept. That is, the power source is not started operating.

If the output of the first driving force reference means 124 based on the operated amount of the first pedal is a braking force, the processing proceeds to the process Step 136 to start operation of the power source. The other processes are the same as the processes Step 134 to Step 138 in FIG. 14.

By doing so, since operation of the power source can be started while the first pedal is being operated to generate a braking force in the one pedal mode, the power source can be started operating while the car is kept safely stopped.

TABLE 1

| | | following | acceleration (km/h/s) | |
|---|---|---|---|---|
| mode | max. speed (km/h) | distance (m) | straight & left turn | right turn |
| 1 | 60 | 45 | 10 | 15 |
| 2 | 30 | 15 | 5 | 15 |
| 3 | 110 | 110 | 20 | 20 |

Table 1 shows an embodiment of a running condition under the one pedal mode in an apparatus for controlling run of a car in accordance with the present invention. In the embodiment shown in Table 1, the three modes are set for a country or an area where a navigable lane for cars on the road is regulated on the left with respect to traffic flow, and the maximum speed, the following distance and the acceleration for each mode are set. Therein, two kinds of accelerations for straight/left turn running and right turn running are set. By the system installed with such a running condition, a set acceleration can be changed at right turning. Therein, the case of the mode 3 is for running on a highway where there are no right turning nor left turning, and accordingly the values of acceleration are the same because the there is no need to set a difference between the accelerations. The following distance is a set value corresponding to the maximum speed, and accordingly in an actual control the following distance may be set so as to be changed in linking with a speed when the speed is slower than the maximum speed. The driver can freely set each of the values, but it is preferable from the viewpoint of safety that the following distance has a lower limit value corresponding to a set value of the maximum speed so that a following distance smaller than the lower limit value can not be set. Further, the accelerations for straight running and for left turn running are set to the same value in this embodiment, but may be set to different values. In a case of a country or an area where a navigable lane for cars on the road is regulated on the right with respect to traffic flow, the same condition can be held by exchanging right turn and left turn in Table 1.

TABLE 1

| | | following | acceleration (km/h/s) | |
|---|---|---|---|---|
| mode | max. speed (km/h) | distance (m) | right turn, left turn | straight |
| 1 | 60 | 45 | 15 | 10 |
| 2 | 30 | 15 | 15 | 5 |
| 3 | 110 | 110 | 20 | 20 |

Table 2 shows another embodiment of a running condition under the one pedal mode in an apparatus for controlling run of a car in accordance with the present invention. In the embodiment shown in Table 2, the three modes are set for a country or an area where a navigable lane for cars on the road is regulated on the left with respect to traffic flow, and the maximum speed, the following distance and the acceleration for each mode are set. Therein, two kinds of accelerations for straight running and right/left turn running are set. By the system installed with such a running condition, a set acceleration can be changed at right or left turning. Therein, similarly to Table 1, the case of the mode 3 is for running on a highway where there are no right turning nor left turning, and accordingly the values of acceleration are the same because the there is no need to set a difference between the accelerations. The following distance is a set value corresponding to the maximum speed, and accordingly in an actual control the following distance may be set so as to be changed in linking with a speed when the speed is slower than the maximum speed. Similarly to the case of Table 1, the driver can freely set each of the values, but it is preferable from the viewpoint of safety that the following distance has a lower limit value corresponding to a set value of the maximum speed so that a following distance smaller than the lower limit value can not be set.

Figure 17:
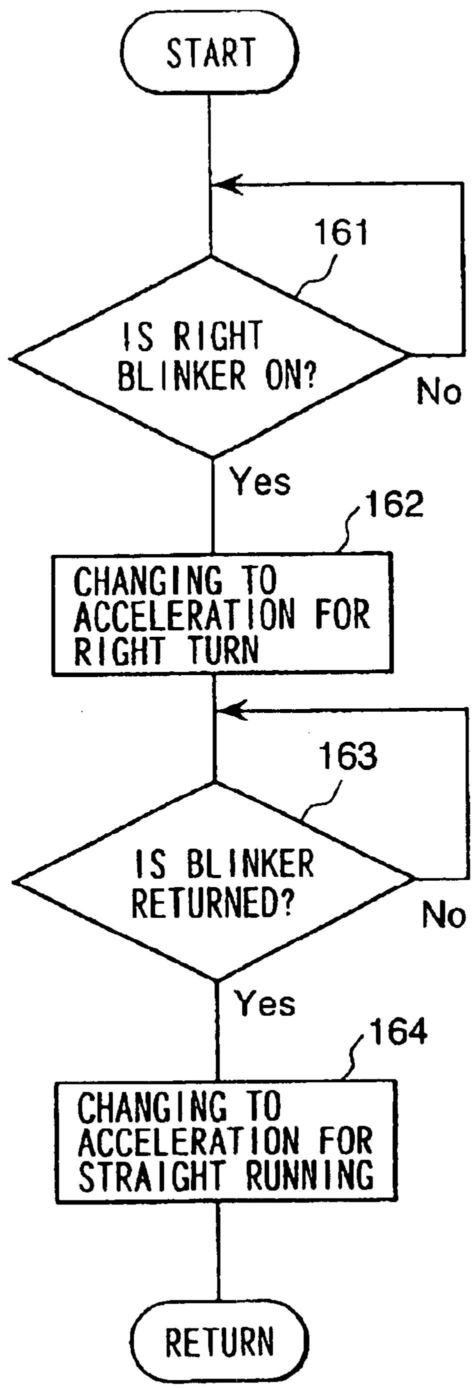
FIG. 17 is a flowchart showing the procedure changing acceleration by a blinker in an embodiment of an apparatus for controlling run of a car in accordance with the present invention.

FIG. 17 is a flowchart showing the procedure changing acceleration by a blinker in an embodiment of an apparatus for controlling run of a car in accordance with the present invention. The control unit 9 periodically executes the processing according to the flowchart shown in FIG. 17 every a preset time interval. In this embodiment, FIG. 17 shows a case where the acceleration is changed to an acceleration for right turn running when the car turns to the right.

If it is judged in the process Step 161 that the blinker is switched on to the right direction, the processing proceeds to the process Step 162 and the acceleration is changed to the preset right turn acceleration.

After changing, if it is judged in the process Step 163 that the blinker is returned, the processing proceeds to the process Step 162 and the acceleration is changed to the preset straight turn acceleration. As described above, the acceleration can be changed when the car is turned to the right.

Figure 18:
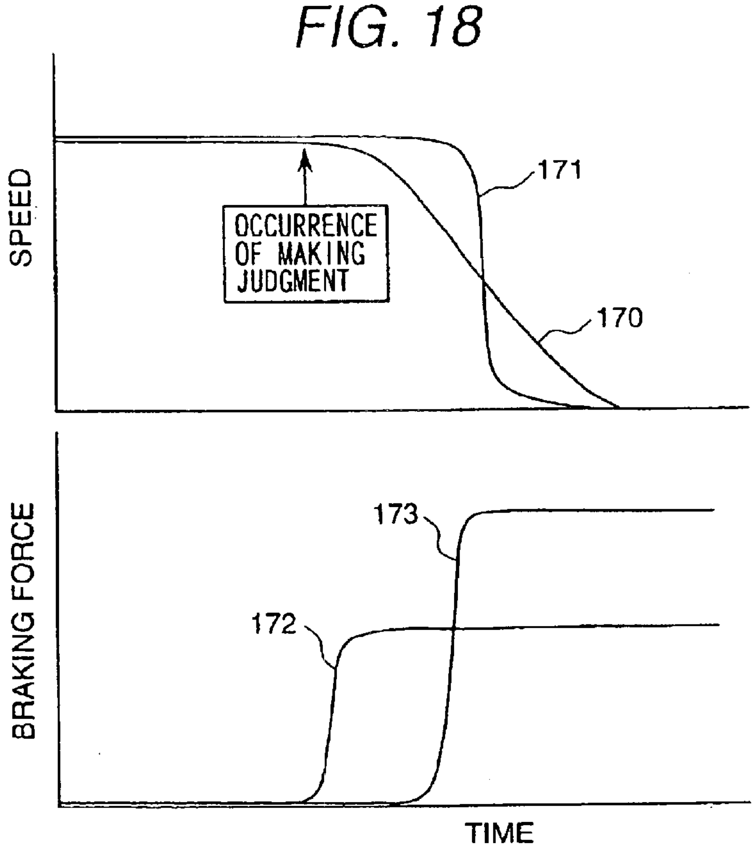
FIG. 18 is a chart showing an example of patterns time versus speed and time versus braking force in an embodiment of an apparatus for controlling run of a car comprising one-pedal mode in accordance with the present invention.
Figure 19:
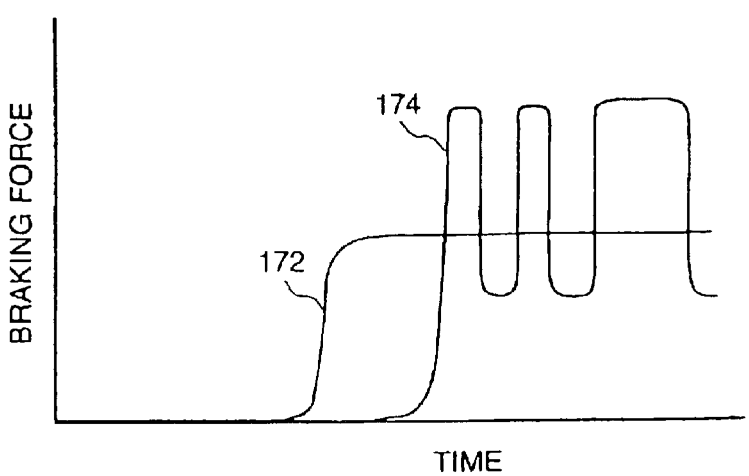
FIG. 19 is a chart showing an example of patterns time versus speed and time versus braking force in another embodiment of an apparatus for controlling run of a car comprising one-pedal mode in accordance with the present invention.

FIG. 18 shows an example of patterns time versus speed and time versus braking force in an embodiment of an apparatus for controlling run of a car comprising one-pedal mode in accordance with the present invention. The speed curve 170 corresponds to the braking force curve 172, and the speed curve 171 corresponds to the braking force curve 173. The speed curve 170 in FIG. 18 shows a deceleration pattern that the car is stopped at a target stop point from the time when the control unit 9 judges that necessity of braking occurs. The braking force curve 172 at that time is a value of braking force at least without wheel locking, and the value of braking force is calculated using a road surface condition and a car condition by the control unit 9. However, when the driver neglects such braking operation even if the control unit 9 judges that necessity of braking occurs, a warning is made on the driver by giving a light shock by generating a large braking force as shown by the braking force curve 173 but within a range not affecting health of the driver using the control unit 9. The braking force at that time is such a braking force that wheel locking does not occur. Further, the braking force for the warning may change its intensity with time as shown by the braking force curve 174 of FIG. 19.

Figure 20:
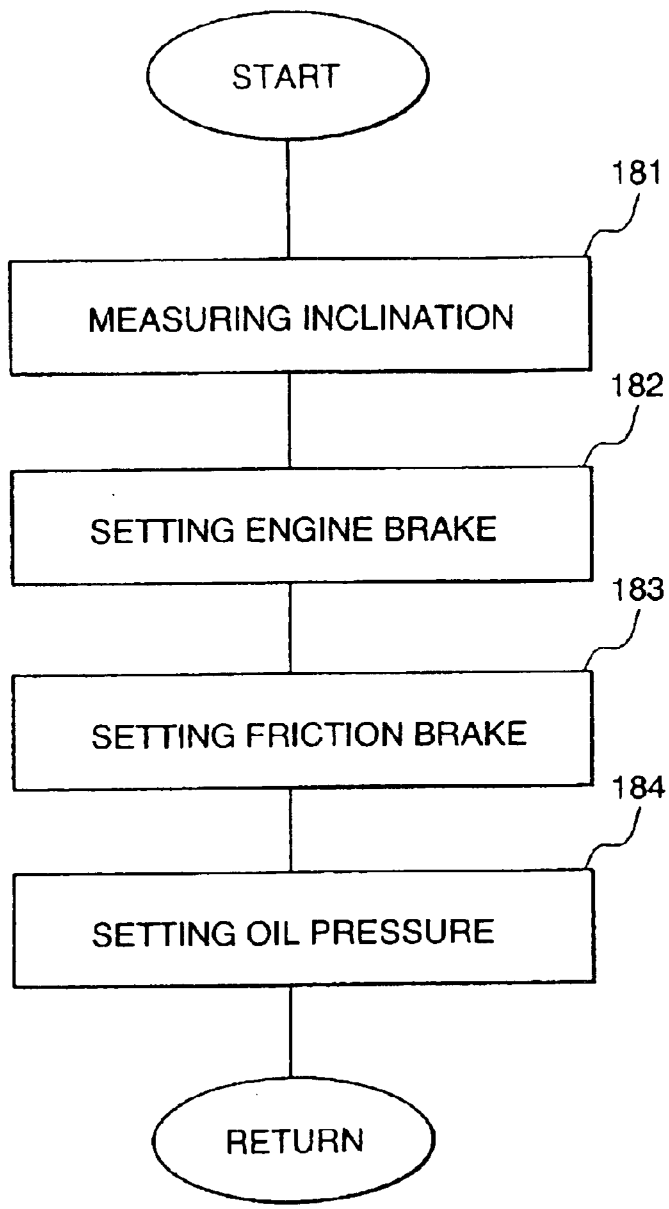
FIG. 20 is a flowchart of a control procedure when a braking force is generated in the apparatus for controlling run of a car in accordance with the present invention.

FIG. 20 is a flowchart of a control procedure when a braking force is generated in the apparatus for controlling run of a car in accordance with the present invention. This procedure is performed by the control unit 9.

Initially, in the inclination measurement of the process Step 181, an inclination of at a point on a road where the self-car exists is measured. In the engine brake setting in the process Step 182, setting of a braking force by the engine is performed. In the friction brake setting in the process Step 183, setting of a reference value of braking force by the friction brake attached to each of the wheels is performed. In the oil pressure of the processing Step 184, setting of holding or releasing of the oil pressure for operating the friction brake is performed.

Figure 21:
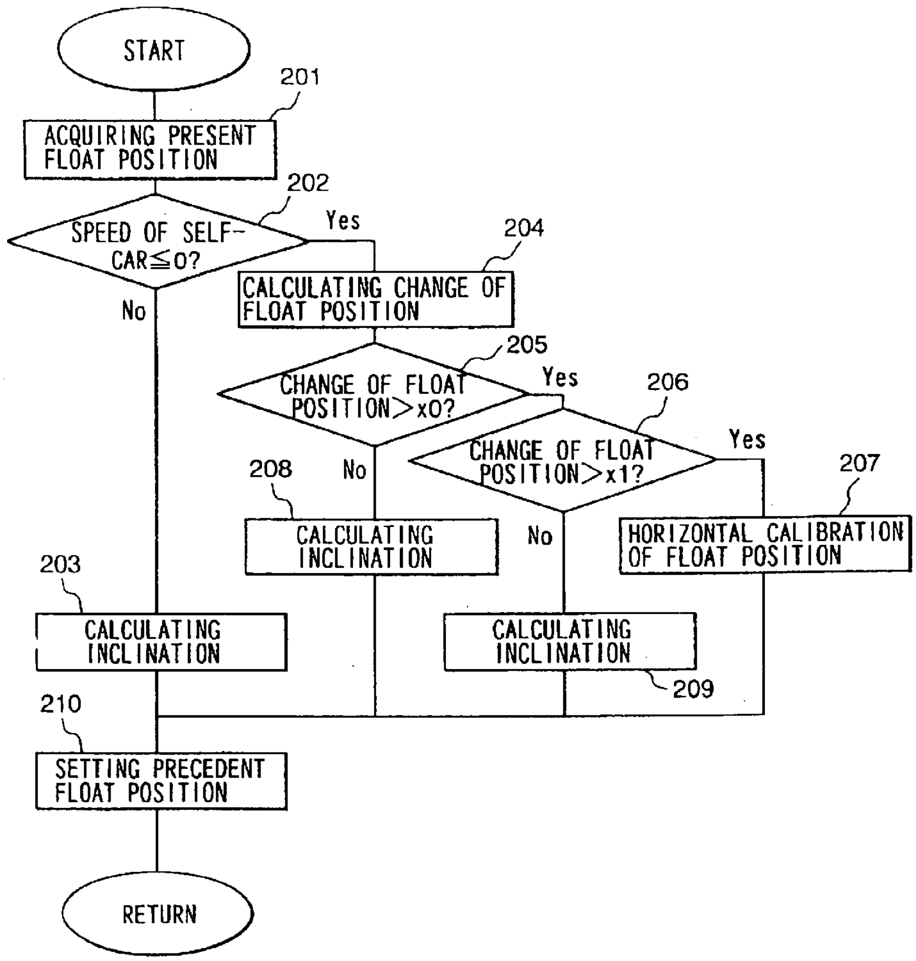
FIG. 21 is a flowchart showing the procedure of measuring an inclination of a road in an embodiment in accordance with the present invention.

FIG. 21 is a flowchart showing the procedure of measuring an inclination of a road in the inclination measuring of FIG. 20 using a float for measuring an amount of remaining fuel in a fuel tank in the embodiment in accordance with the present invention.

In the process Step 201, float position information at present time is acquired.

In the processing Step 202, from that a speed of the self-car is 0 [m/s] or less, it is judged whether or not the self-car is stopped. If it is judged that the self-car is stopped from checking that a speed of the self-car is 0 [m/s] or less, the processing proceeds to the process Step 204. If it is judged that the self-car is not stopped, the processing proceeds to the process Step 203.

In the process Step 204, a displacing amount of the float position is calculated based on the float position information at present time acquired in the processing Step 201 and a float position information at present time acquired in the preceding cycle.

In the process Step 203, an inclination is calculated based on the float position information at present time acquired in the processing Step 201.

In the process Step 205, it is judged whether or not the displacing amount of the float position calculated in the process Step 204 is larger than a preset value x0. If it is larger, the processing proceeds to the process Step 206. If not, the processing proceeds to the process Step 208.

In the process Step 208, an inclination is calculated through the same process as in the inclination calculation of the process Step 203.

In the process Step 206, it is judged whether or not the displacing amount of the float position calculated in the process Step 204 is smaller than a preset value x1. If smaller than a preset value x1, the processing proceeds to the process Step 207. If not, the processing proceeds to the process Step 209.

It is assumed that a gas station is a horizontal place, and from checking that the self-car is refueled it is judged whether or not the self-car is in the gas station. Since a displacing amount of the float position during refueling is smaller than a displacing amount of the float position when an inclination changes, in the judgment in the process Step 205 and in the process Step 206 it is judged whether or not the self-car is in the gas station. That is, the judgment in the process Step 205 and in the process Step 206 judges whether or not the self-car is in a horizontal position.

In the process Step 207, a float position when the inclination is 0 [%] is set.

In the process Step 209, an inclination is calculated through the same process as in the inclination calculation of the process Step 203.

In the process Step 210, the float position at present time acquired in the processing Step 201 is set to the float position in the preceding cycle. Thus, the routine is completed.

As in the present embodiment, there is no need to newly add a sensor for measuring inclination by measuring an inclination of a road using a remaining fuel meter attached to any car, which can prevent cost increase.

Figure 22:
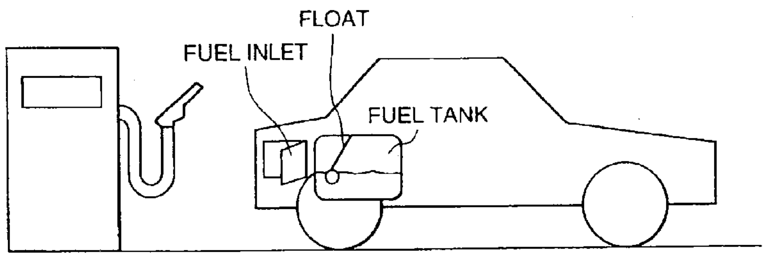
FIG. 22 is a schematic view showing inclination measurement.
Figure 22:
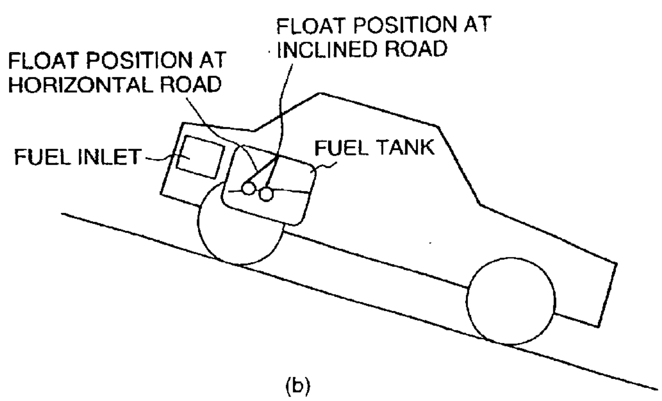

FIG. 22 is a schematic view explaining the inclination measurement processing of FIG. 21. FIG. 22(*a*) shows a state in which a horizontal position of the float is being calibrated, and (*b*) shows a state in which an inclination is being measured.

When the float position in the horizontal position is calibrated, it is judged that the float position during refueling at a gas station is the horizontal position assuming that the gas station is a horizontal place. Since a displacing amount of the float position during refueling is smaller than a displacing amount of the float position when an inclination changes. Therefore, by measuring a displacing amount of the float position and by judging whether or not the self-car is being refueled, it can be judged whether or not the self-car is on a horizontal position. As shown by FIG. 22(*b*), when the self-car is on an inclined road, the float is moved together with the position of the surface of fuel because the fuel tank itself is inclined together with the self-car but the surface of fuel is kept horizontal. Therefore, a magnitude of inclination of an inclined road can be measured from the difference between the float position at the horizontal place and the float position at the inclined road.

Figure 23:
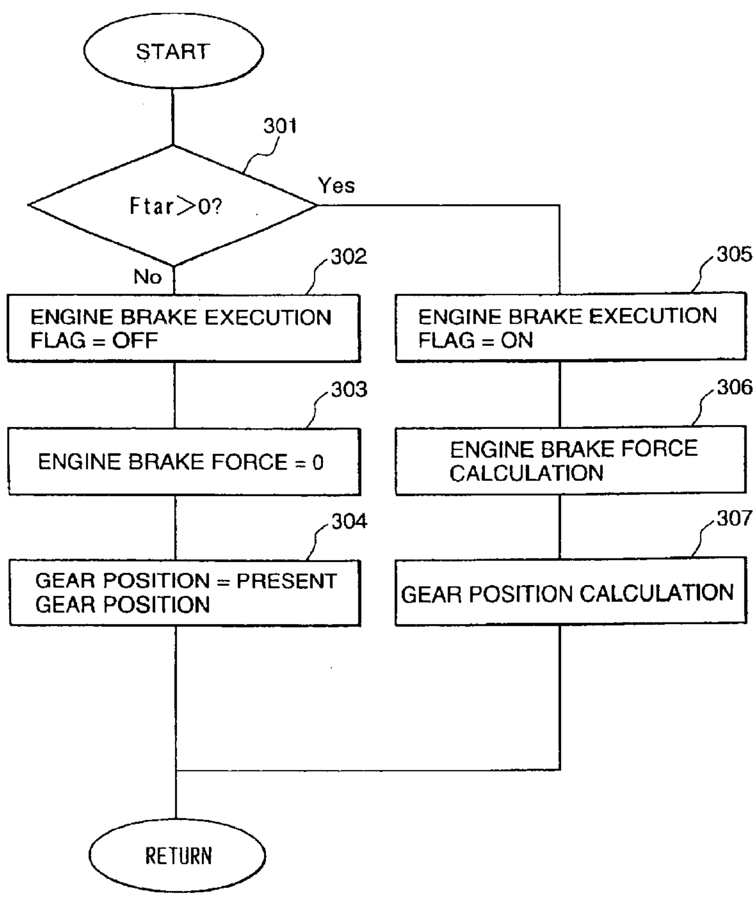
FIG. 23 is a flowchart showing the procedure of setting engine brake in an embodiment in accordance with the present invention.
Figure 24:
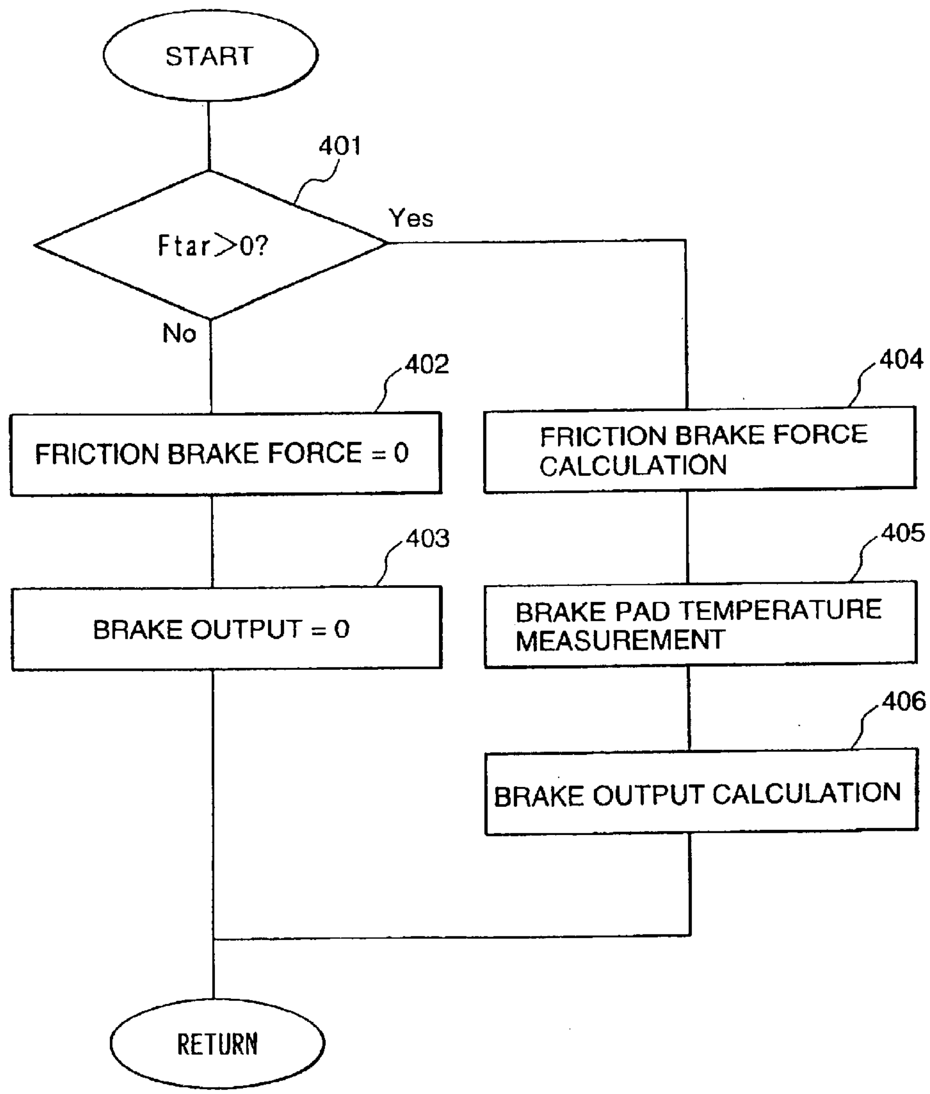
FIG. 24 is a flowchart showing the procedure of setting a frictional braking force in an embodiment in accordance with the present invention.

FIG. 23 and FIG. 24 are flowcharts showing the procedure of judging operation of main brake in an embodiment in accordance with the present invention. This processing is also executed by the control unit 9.

FIG. 23 is the flowchart showing the procedure of setting engine brake in the process Step 182 of FIG. 20.

In the process Step 301, it is judged whether or not a target braking force Ftar is larger than 0 [N]. If the target braking force Ftar is larger than 0 [N], the processing proceeds to the process Step 305. If not, the processing proceeds to the process Step 302.

In the process Step 302, an engine brake execution flag for setting whether or not engine brake is executed is set to OFF so that engine brake is not executed.

In the process Step 303, a reference value of an engine braking force Fbe is set to 0 [N].

In the process Step 304, a pre-calculated gear position of the transmission is set to a gear position as it is, and the routine is completed.

In the process Step 305, the engine brake execution flag is set to ON so that engine brake is executed.

In the process Step 306, an engine braking force Fbe is calculated based on the target braking force Ftar.

In the process Step 307, a gear position of the transmission is calculated based on the engine braking force Fbe calculated in the process Step 306. Thus the routine is completed.

By performing engine brake by changing the gear position as described above, a larger braking force can be obtained by the engine brake.

FIG. 24 is a flowchart showing the procedure of setting a frictional braking force in the process Step 183 of FIG. 20.

In the process Step 401, it is judged whether or not a target braking force Ftar is larger than 0 [N]. If the target braking force Ftar is larger than 0 [N], the processing proceeds to the process Step 404. If not, the processing proceeds to the process Step 402.

In the process Step 402, a braking force Fbd by the friction brake is set to 0 [N].

In the process Step 403, a reference value of the friction brake is set to 0 [N].

In the process Step 404, a braking force Fbd by the friction brake is calculated using (Equation 1) based on the target braking force Ftar and the engine braking force Fbe.

$$Fbd=Ftar-Fbe \qquad \text{(Equation 1)}$$

In the process Step 405, temperature of the brake pad is measured in order to correct the braking force.

In the process Step 406, a reference value to the friction brake is set based on the temperature of the brake pad measured in the process Step 405. Thus this routine is completed. By setting the reference value to the friction brake based on the temperature of the brake pad, a stable braking force can be obtained regardless of the temperature of the brake pad.

Figure 25:
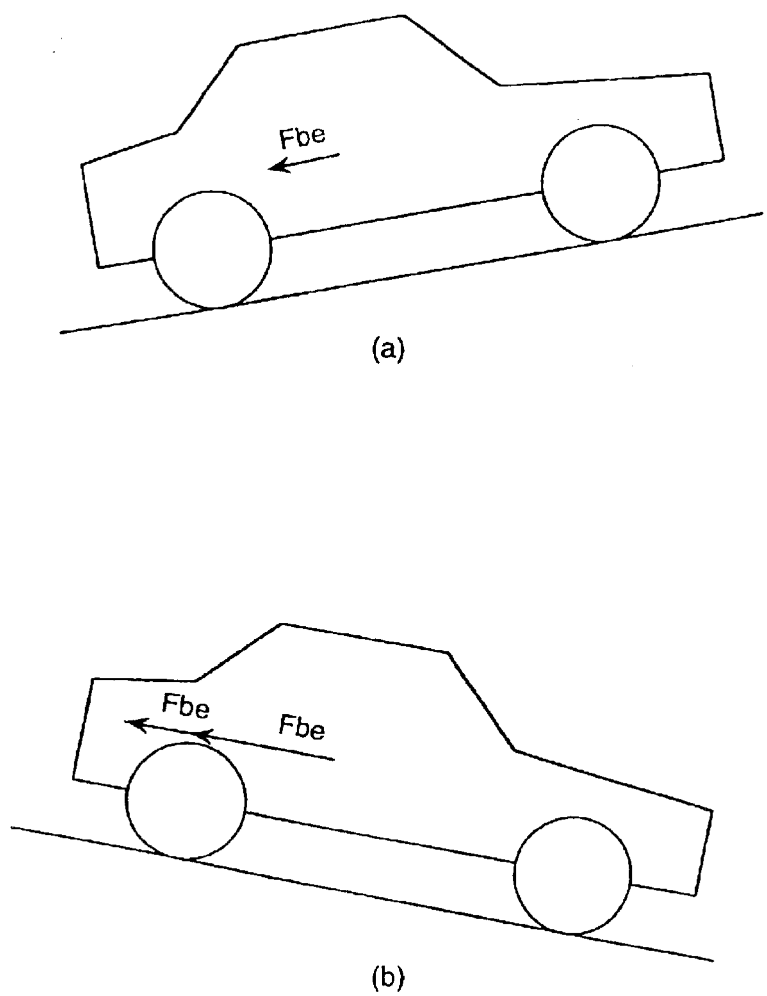
FIG. 25 is a schematic view explaining cases of decelerating on an inclined road.

FIG. 25 is a schematic view explaining cases of decelerating on an inclined road. FIG. 25(*a*) shows an example when the car is decelerated on an ascending road, and (*b*) shows an example when the car is decelerated on a descending road.

Since on an ascending road a component of a force of the car weight in the inclination direction acts in the direction decelerating the car, a smaller braking force is sufficient. In a case where a braking force is generated on the ascending road, if the target braking force Ftar is smaller than the maximum braking force capable of being generated by the engine brake, the braking force Fbd is generated only by the engine brake. Since on a descending road a component of a force of the car weight in the inclination direction acts in the direction accelerating the car, a larger braking force is required. In a case where a braking force is generated on the descending road, if the target braking force Ftar is larger than the maximum braking force capable of being generated by the engine brake, the braking force Fbd is generated by the engine brake and a braking force Fed insufficient in the engine brake is generated by the friction brake. If the target braking force Ftar is within a range of the force capable of being generated by the engine brake, the engine brake is used and the braking force by the friction brake is suppressed. Since fuel is not injected during the engine braking, wearing of the pad and fuel consumption can be suppressed.

Figure 26:
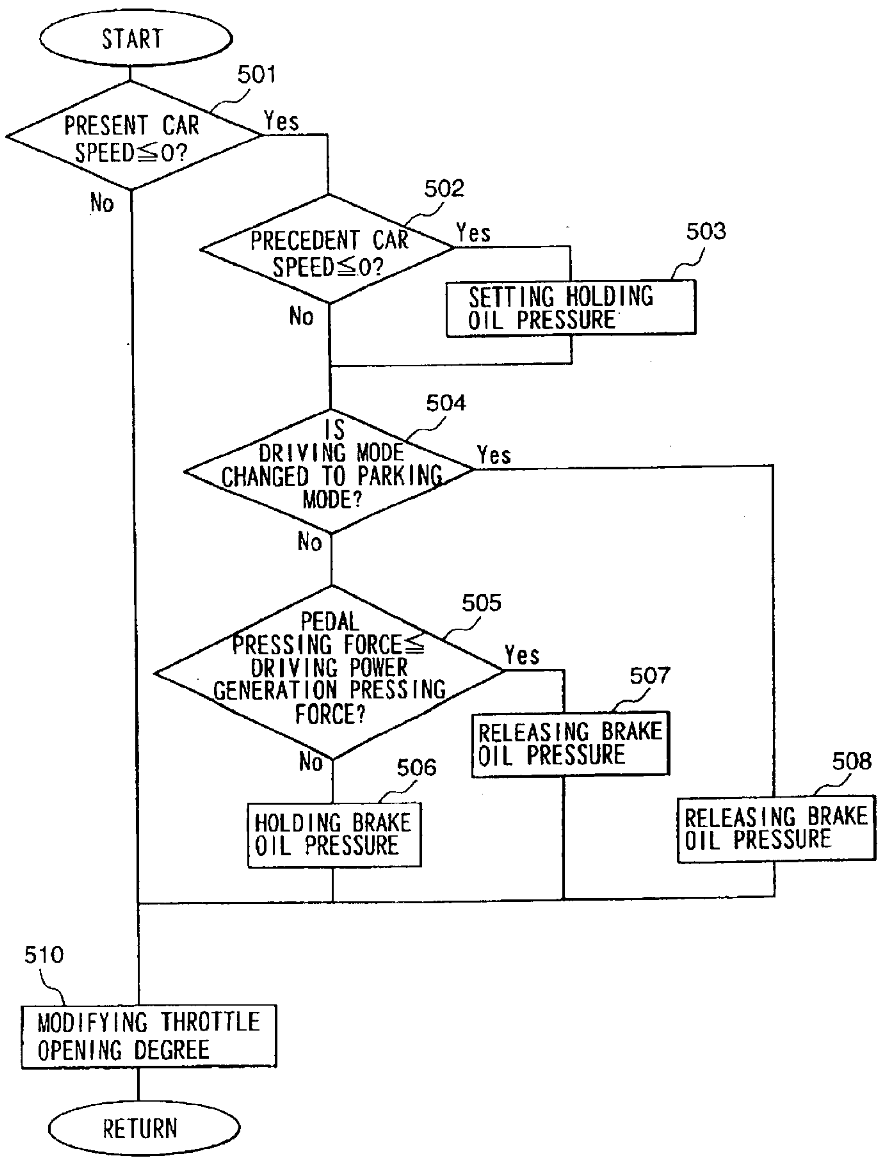
FIG. 26 is a flowchart showing the procedure of setting an oil pressure in an embodiment in accordance with the present invention.

FIG. 26 is a flowchart showing the procedure of setting the oil pressure in the process Step 184 of FIG. 20 in the embodiment in accordance with the present invention.

In the process Step 501, by checking whether or not the speed of the self-car at present time is smaller than 0 [m/s], it is judged whether or not the self-car is stopped. If it is judged that the self-car is stopped from checking that the speed of the self-car at present time is smaller than 0 [m/s], the processing proceeds to the process Step 502. If not, the processing proceeds to the process Step 510.

In the process Step 502, by checking whether or not the preceding speed of the self-car is larger than 0 [m/s], it is judged whether or not the self-car is running in the preceding cycle. If it is judged that the self-car is running from checking that the preceding speed of the self-car is larger than 0 [m/s], the processing proceeds to the process Step 503. If not, the processing proceeds to the process Step 504.

In the process Step 503, a brake oil pressure for keeping the car stopped is set based on the magnitude of the inclination. The brake oil pressure is set larger as the absolute value of the inclination is larger.

In the process Step 504, it is judged whether or not the mode is changed from the driving mode to the parking mode. If the mode is changed from the driving mode to the parking mode, the processing proceeds to the process Step 508. If not, the processing proceeds to the process Step 505.

In the process Step 505, it is judged whether or not a pedal stepping force is smaller than the driving force generating stepping force. If the pedal stepping force is smaller than the driving force generating stepping force, the processing proceed the process Step 507. If not, the processing proceeds to the process Step 506.

In the process Step 506, the brake oil pressure set in the process Step 503 is maintained even if the driver weakens the pedal stepping force.

In the process Step 507, the brake oil pressure maintained is released In the process Step 508, the brake oil pressure maintained is also released, similarly to the process Step 507. By releasing the brake oil pressure maintained during stopping of the car, the energy used for maintaining the brake oil pressure can be saved.

In the process Step 510, when it is judged that the car is on the ascending road based on the inclination described above, a throttle opening degree is modified in order to generate a driving force so large that the self-car does not moved backward even if the brake oil pressure is released.

Figure 27:
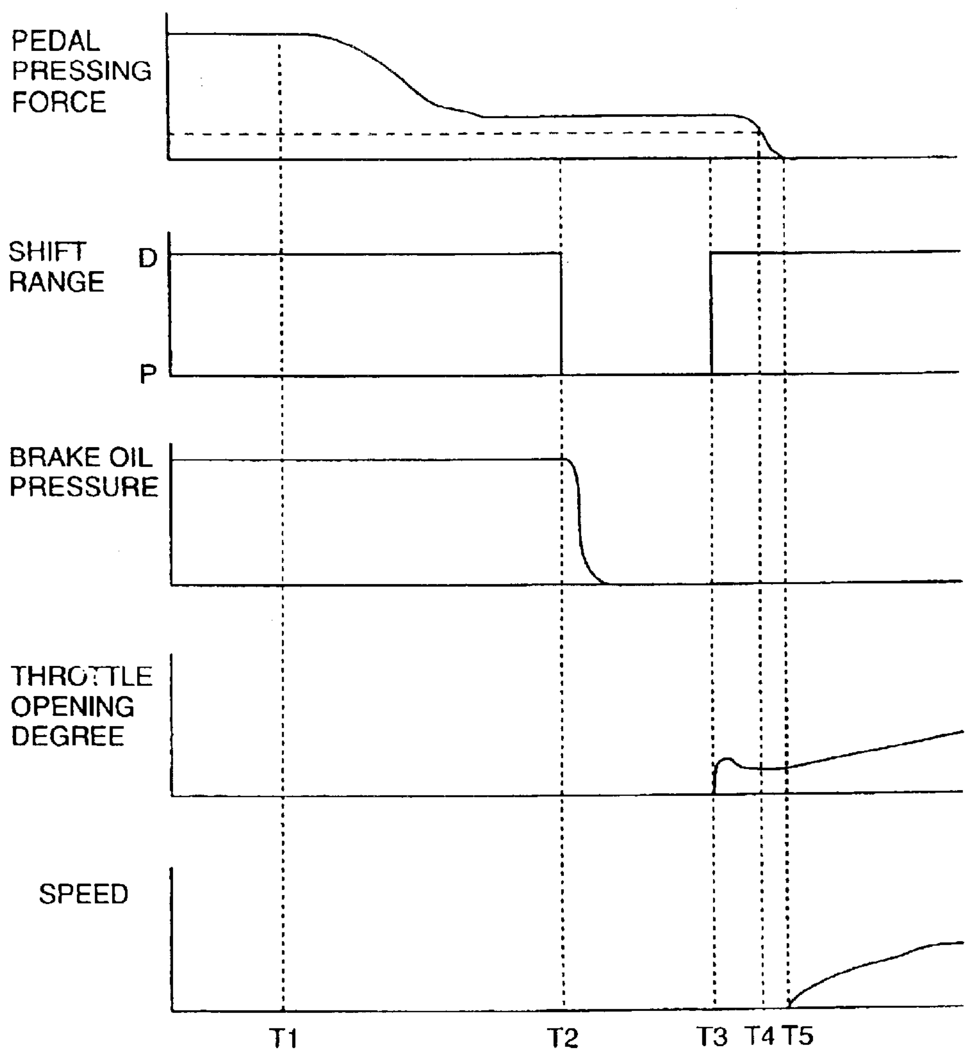
FIG. 27 is a time chart when a car is started on an ascending road.

FIG. 27 is a time chart when the car is started on an ascending road by the control processing according to the flowchart shown in FIG. 26.

Although the driver weakens the pedal stepping force at a time point T1 after the self-car is stopped, the brake oil pressure at stopping the car is maintained. When the shift range is changed from the D range to the P range at a time point T2, the brake oil pressure is released. Although the brake oil pressure is released, the car is not moved because of the P range. When the shift range is changed from the P range to the D range at a time point T3, a driving force is generated by opening the throttle so that the self-car is not moved backward. At a time point T4 when the pedal stepping force becomes smaller than the driving force generating stepping force, the throttle is being opened in order to starting the self-car. Since there is a time lag from opening the throttle to transmitting the driving force to the road, the self-car is starting to move at a time point T5.

Figure 28:
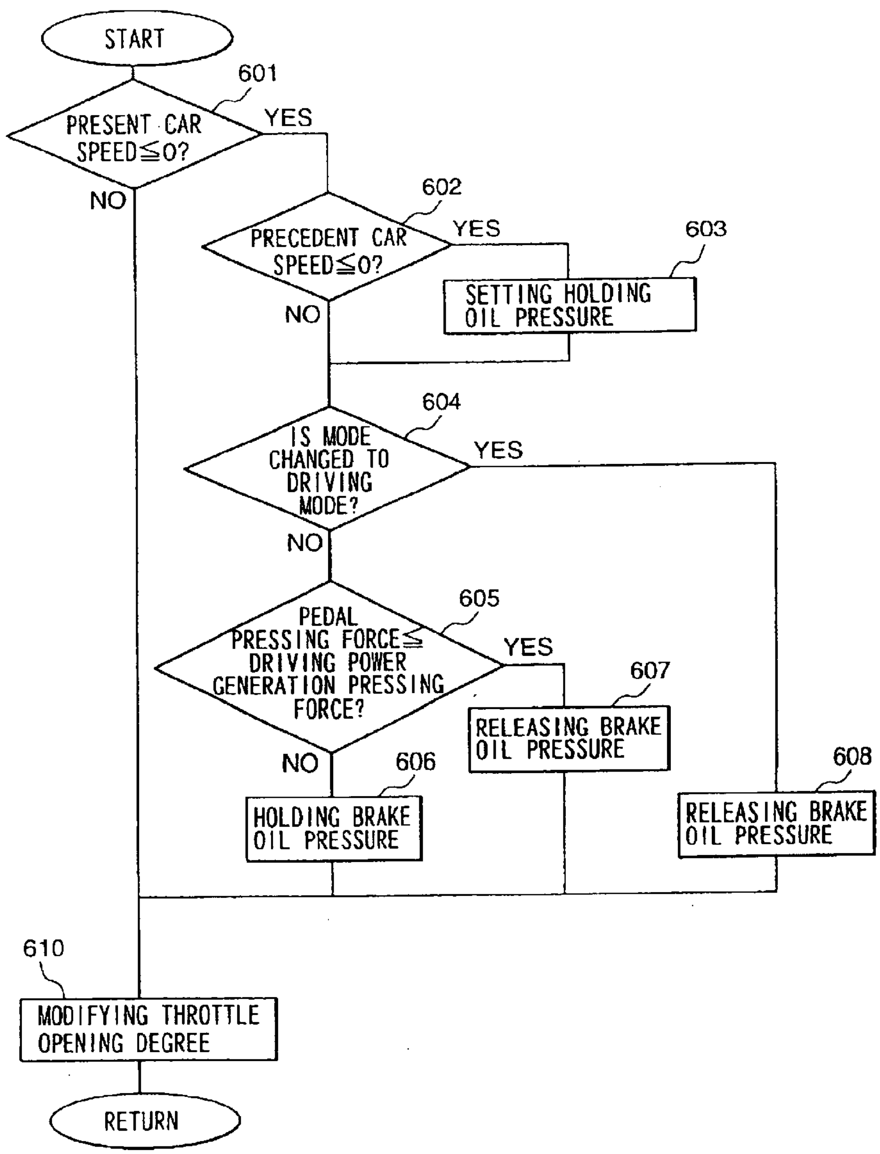
FIG. 28 is a flowchart showing the procedure of setting an oil pressure in an embodiment in accordance with the present invention.

FIG. 28 is a flowchart showing the procedure of setting the oil pressure in the process Step 184 of FIG. 20 in the embodiment in accordance with the present invention.

In the process Step 601, by checking whether or not the speed of the self-car at present time is smaller than 0 [m/s], it is judged whether or not the self-car is stopped. If it is judged that the self-car is stopped from checking that the speed of the self-car at present time is smaller than 0 [m/s], the processing proceeds to the process Step 602. If not, the processing proceeds to the process Step 610.

In the process Step 602, by checking whether or not the preceding speed of the self-car is larger than 0 [m/s], it is judged whether or not the self-car is running in the preceding cycle. If it is judged that the self-car is running from checking that the preceding speed of the self-car is larger than 0 [m/s], the processing proceeds to the process Step 603. If not, the processing proceeds to the process Step 604.

In the process Step 603, a brake oil pressure for keeping the car stopped is set based on the magnitude of the inclination. The brake oil pressure is set larger as the absolute value of the inclination is larger.

In the process Step 604, it is judged whether or not the mode is changed to the driving mode. If the mode is changed to the driving mode, the processing proceeds to the process Step 608. If not, the processing proceeds to the process Step 605.

In the process Step 605, it is judged whether or not a pedal stepping force is smaller than the driving force generating stepping force. If the pedal stepping force is smaller than the driving force generating stepping force, the processing proceed the process Step 607. If not, the processing proceeds to the process Step 606.

In the process Step 606, the brake oil pressure set in the process Step 603 is maintained even if the driver weakens the pedal stepping force.

In the process Step 607, the brake oil pressure maintained is released. In the process Step 608, the brake oil pressure maintained is also released, similarly to the process Step 607.

In the process Step 610, when it is judged that the car is on the ascending road based on the inclination, a throttle opening degree is modified in order to generate a driving force so large that the self-car does not moved backward even if the brake oil pressure is released.

Figure 29:
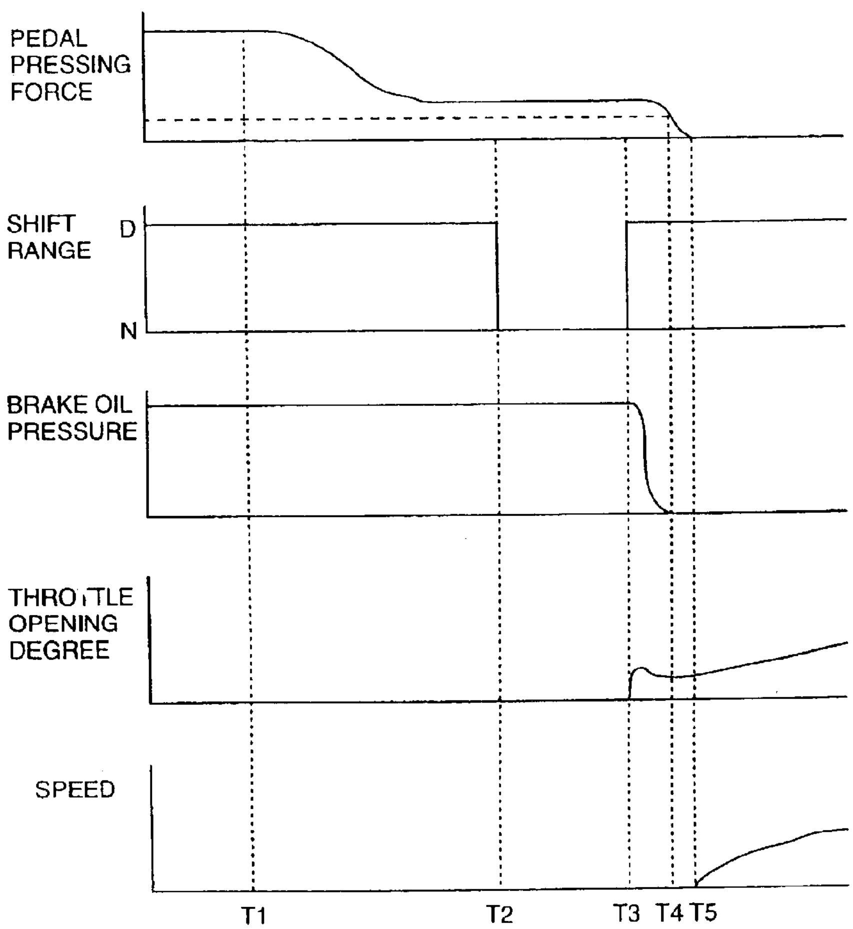
FIG. 29 is a time chart when a car is started on an ascending road.

FIG. 29 is a time chart when the car is started on an ascending road by the control processing according to the flowchart shown in FIG. 28.

Although the driver weakens the pedal stepping force at a time point T1 after the self-car is stopped, the brake oil pressure at stopping the car is maintained. Although the shift range is changed from the D range to the N range at a time point T2, the brake oil pressure is maintained. When the shift range is changed from the N range to the D range at a time point T3, a driving force is generated by opening the throttle so that the self-car is not moved backward. At a time point T4 when the pedal stepping force becomes smaller than the driving force generating stepping force, the throttle is being opened in order to starting the self-car. Since there is a time lag from opening the throttle to transmitting the driving force to the road, the self-car is starting to move at a time point T5.

Figure 30:
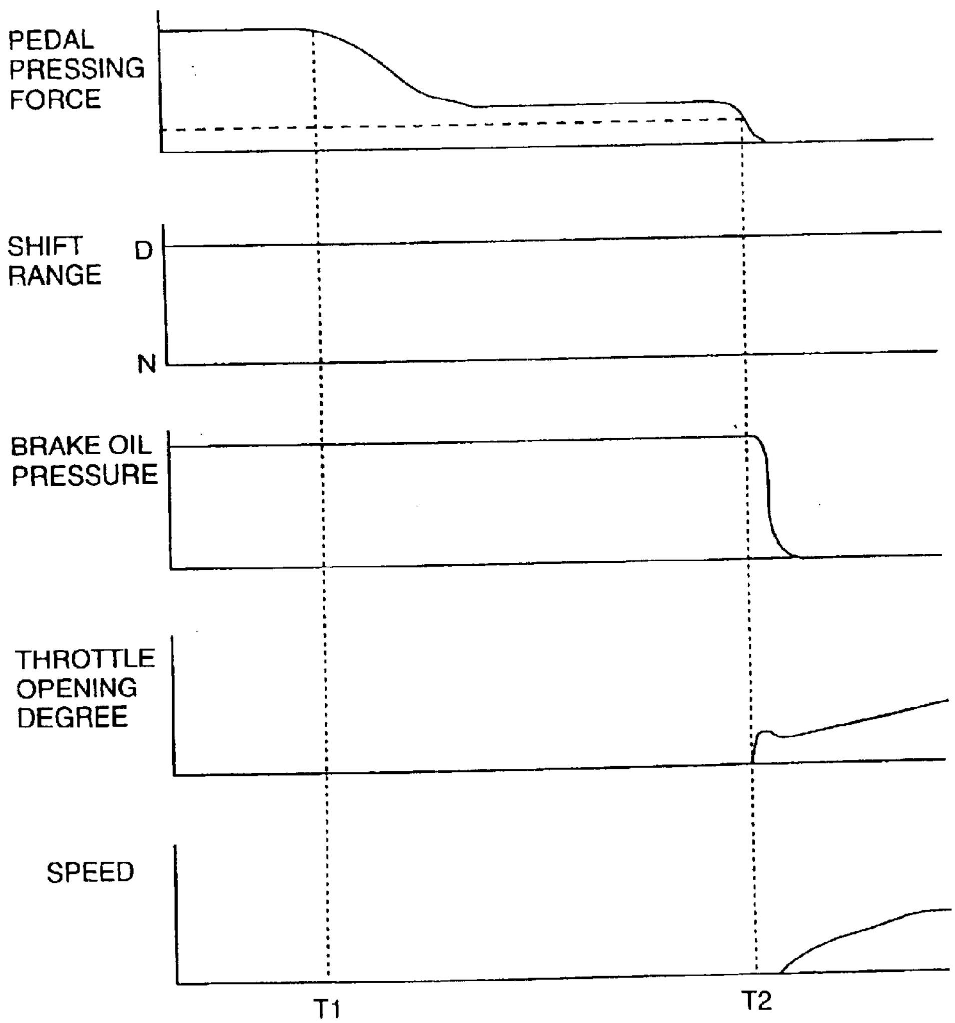
FIG. 30 is a time chart when a car is started on an ascending road.

FIG. 30 is a time chart when the car is started on an ascending road without changing the shift range by the control processing according to the flowchart shown in FIG. 26 and FIG. 28.

Although the driver weakens the pedal stepping force at a time point T1 after the self-car is stopped, the brake oil pressure at stopping the car is maintained. At a time point T4 when the pedal stepping force becomes smaller than the footrest stepping force, the throttle is being opened in order to start the self-car. Since there is a time lag from opening the throttle to transmitting the driving force to the road, the self-car is starting to move at a time point T5.

The present invention is not limited to the embodiments described above, for example, number of the running modes and the setting items are not limited to the above. If the other set values are employed or if there are no set items other than acceleration, the present invention is not affected.

Further, a construction combining parts of the embodiments described above, for example, a footrest apparatus combining the solenoid type and the stopper type may be acceptable if it is within the scope of the present invention. Further, although the embodiment uses an oil pressure brake as the main braking means, the same effect can be obtained using the other type brake such as an electric brake by controlling an amount of electricity.

According to the present invention, by setting the footrest function range and the braking force increasing range to the operating amount or the operating force of the pedal, the driver can start and accelerate, and decelerate and stop the car without detaching the driver's foot from the brake pedal, which reduce the burden of the driver.

What is claimed is:

1. An apparatus for controlling run of a car comprising a first pedal;

a second pedal; and a control unit for executing control of a one-pedal mode which controls both of a braking force and a driving force of said car corresponding to at least any one of an operating amount and an operating force of said first pedal, wherein said apparatus further comprises a radar for detecting at least a distance to one of a preceding vehicle and an obstacle ahead of said car, and in a case where said control unit judges that braking operation of said car is necessary on the basis of said distance detected by said radar, said control unit automatically operates a braking mechanism so as to generate a magnitude of deceleration larger than a minimum necessary magnitude of deceleration which is decided based on said distance detected by said radar if a driver does not make any braking operation within a present time period from occurrence of the judgment.

2. An apparatus for controlling run of a car comprising a first pedal;

a second pedal; and a control unit for executing control of a one-pedal mode which controls both of a braking force and a driving force of said car corresponding to at least any one of an operating amount and an operating force of said first pedal, wherein said apparatus further comprises a radar for detecting at least a distance to one of a preceding vehicle and an obstacle ahead of said car, and in a case where said control unit judges during running that braking operation of said car is necessary on the basis of said distance by said radar, said control unit automatically operates a braking mechanism so as to alternately generate two magnitudes of deceleration if a driver does not make any braking operation within a present time period from occurrence of the judgment.

* * * * *